US007108182B2

(12) United States Patent
Moorhouse et al.

(10) Patent No.: US 7,108,182 B2
(45) **Date of Patent: *Sep. 19, 2006**

(54) OPTICAL SECURITY SYSTEM

(75) Inventors: John H. Moorhouse, P.O. Box 236, Clear Lake, MN (US) 55319; Michael A. Bodin, Champlin, MN (US); Kurt Larsen, Rockford, MN (US)

(73) Assignee: John H. Moorhouse, Edina, MN (US)

( * ) Notice: Subject to any disclaimer, the term of this patent is extended or adjusted under 35 U.S.C. 154(b) by 109 days.

This patent is subject to a terminal disclaimer.

(21) Appl. No.: 10/774,305

(22) Filed: Feb. 6, 2004

(65) Prior Publication Data

US 2004/0256461 A1 Dec. 23, 2004

Related U.S. Application Data

(63) Continuation-in-part of application No. 10/268,065, filed on Oct. 9, 2002, now Pat. No. 6,764,007, which is a continuation of application No. 10/057,598, filed on Jan. 24, 2002, now Pat. No. 6,499,660.

(51) Int. Cl.
*G06K 7/10* (2006.01)

(52) U.S. Cl. .................. 235/454; 235/130 R; 235/375; 70/358; 70/365; 70/278.3

(58) Field of Classification Search ................ 235/454, 235/130 R, 375; 70/50, 56, 338, 283, 358, 70/366, 362–364, 419, 493, 421, 278.3; 340/5.73, 340/5.65

See application file for complete search history.

(56) References Cited

U.S. PATENT DOCUMENTS

| | | | |
|---|---|---|---|
| 541,630 | A | 6/1895 | Ridgway |
| 1,619,252 | A | 3/1927 | George |
| 2,008,150 | A | 7/1935 | Nelson |
| 2,111,098 | A | 3/1938 | Segal |
| 2,145,085 | A | 1/1939 | Heyer |
| 2,222,027 | A | 11/1940 | Golden et al. |

(Continued)

FOREIGN PATENT DOCUMENTS

| | | |
|---|---|---|
| GB | 21615 36 | 1/1986 |

(Continued)

OTHER PUBLICATIONS

Sal Dulcamaro, *Abloy Disklock Pro*, *The National Locksmith*, Nov. 2001, pp. 16-25.

*Primary Examiner*—Thien M. Le
*Assistant Examiner*—Allyson N Trail
(74) *Attorney, Agent, or Firm*—Patterson, Thuente, Skaar & Christensen

(57) ABSTRACT

An optical security system having a key, an optic lock, and a processing system. The lock generally has a plurality of optic reflective sensors, a plurality of readable discs, and a controller for processing information to and from the plurality of sensors. The optic security lock senses the surface changes of state during the rotation of the plurality of discs caused by the turning of the fully-engaged key. The data from the sensors is communicated to the controller, with the controller having a processor capable of processing data from the sensors. The processing system analyzes the data from the controller and compares the data to known information in a database for generating a lock command signal. The optic lock can further include input device for inputting transaction data to facilitate consumer purchasing transactions, security transactions, verification transaction, credit card transactions, and the like.

43 Claims, 29 Drawing Sheets

U.S. PATENT DOCUMENTS

| | | | | |
|---|---|---|---|---|
| 2,618,957 | A | 11/1952 | Tonnessen | |
| 3,197,985 | A | 8/1965 | Cosio | |
| 3,260,082 | A | 7/1966 | Bodek et al. | |
| 3,380,268 | A | 4/1968 | Perrill | |
| 3,411,331 | A | 11/1968 | Schlage | |
| 3,422,646 | A | 1/1969 | Monahan | |
| 3,648,492 | A | 3/1972 | Walters et al. | |
| 3,728,880 | A | 4/1973 | Falk | |
| 3,738,136 | A | 6/1973 | Falk | |
| 3,783,660 | A | 1/1974 | Gill | |
| RE28,319 | E | 1/1975 | Kerr | |
| 3,885,409 | A | 5/1975 | Genakis | |
| 3,889,501 | A * | 6/1975 | Fort | 70/283 |
| 3,903,720 | A | 9/1975 | Scherbing | |
| 3,916,657 | A | 11/1975 | Steinbach | |
| 4,012,931 | A | 3/1977 | Harunari | |
| 4,041,739 | A | 8/1977 | Mercurio | |
| 4,068,509 | A | 1/1978 | Genakis | |
| 4,090,175 | A * | 5/1978 | Hart | 340/5.3 |
| 4,143,530 | A | 3/1979 | Murtezov et al. | |
| 4,194,378 | A | 3/1980 | Swindler et al. | |
| 4,222,252 | A | 9/1980 | Tietz | |
| 4,233,828 | A | 11/1980 | Dauenbaugh | |
| 4,322,719 | A | 3/1982 | Moorhouse | |
| 4,455,552 | A | 6/1984 | Greiner et al. | |
| 4,593,185 | A | 6/1986 | Patzelt et al. | |
| 4,653,297 | A | 3/1987 | Moorhouse | |
| 4,802,354 | A | 2/1989 | Johnson | |
| 4,812,838 | A * | 3/1989 | Tashiro et al. | 340/3.42 |
| 4,838,060 | A | 6/1989 | Hutzenlaub | |
| 5,018,376 | A | 5/1991 | Lee | |
| 5,060,494 | A | 10/1991 | Moorhouse | |
| 5,117,664 | A * | 6/1992 | Kurozu et al. | 70/252 |
| 5,121,102 | A * | 6/1992 | Stricklin, Jr. | 340/521 |
| 5,552,587 | A | 9/1996 | Moorhouse | |
| 5,964,111 | A * | 10/1999 | Lambert | 70/493 |
| 6,144,847 | A * | 11/2000 | Altschul et al. | 455/407 |
| 6,318,137 | B1 * | 11/2001 | Chaum | 70/278.3 |
| 6,359,547 | B1 * | 3/2002 | Denison et al. | 340/5.73 |
| 6,494,067 | B1 | 12/2002 | Jasper | |
| 6,499,660 | B1 | 12/2002 | Moorhouse et al. | |
| 6,526,786 | B1 * | 3/2003 | Kayoda | 70/56 |
| 6,552,650 | B1 * | 4/2003 | Gokcebay et al. | 340/5.65 |
| 6,764,007 | B1 * | 7/2004 | Moorhouse et al. | 235/454 |
| 2002/0112512 | A1 * | 8/2002 | Li | 70/366 |
| 2005/0168320 | A1 * | 8/2005 | Henderson et al. | 340/5.25 |

FOREIGN PATENT DOCUMENTS

| | | |
|---|---|---|
| SU | 1008397 | 3/1983 |

* cited by examiner

OPTICAL SECURITY SYSTEM

This application is a Continuation-In-Part of U.S. patent application Ser. No. 10/268,065, filed Oct. 9, 2002 now U.S. Pat. No. 6,764,007, which is a Continuing Application of U.S. application Ser. No. 10/057,598, filed Jan. 24, 2002 and issued into U.S. Pat. No. 6,499,660, with each of the above applications and disclosures being herein incorporated by reference in their entirety.

FIELD OF THE INVENTION

The present invention relates generally to security, and more particularly, to an optical security system capable of sensing and counting the rotatable movement of a plurality of discs to generate a lock command signal.

BACKGROUND OF THE INVENTION

Traditionally, key locks have been the most commonly used and understood lock systems available. Conventional key lock systems comprise a lock and a corresponding key. Each lock has a key cut to match the specific internal tumblers or wheels of the lock such that only that key will properly align and open the lock. Key blades are cut to predetermined shapes to facilitate proper engagement with a corresponding lock. However, there are fundamental drawbacks to such systems. Namely, there are a limited number of cut configurations for a particular key, thus limiting the number of lock and key combinations that can be manufactured. As a result of this limitation, it is generally accepted that only several thousand distinct lock and key combinations are available in such conventional lock systems. Once that limit has been met it is necessary to recycle the known combinations. This can obviously result in unacceptable results and security vulnerabilities.

Even those conventional lock systems that have attempted to expand on the number of potential key and lock combinations have not achieved the level of success required in those areas of use where security is of the highest priority. Credit card security, transactional security, home safety, personal safety, and concerns over the like have become central issues. As a result, some attempts have been made to find alternatives to conventional lock systems.

A prime example of an alternative to conventional lock systems that has become quite popular, and has found widespread use, is the identification or security card having a magnetic strip. These cards resemble the traditional credit card configuration. Information or magnetic data is stored on the strip. In use, these cards can include various security, personal, identification, and a myriad of other data that enables a device, such as a simple card reader, to make a nearly endless array of discriminatory decisions. In the area of security, these decisions can compare names, citizenship, dates of birth, code numbers, and other information on the magnetic strip with information in the devices memory, or in the memory or database of an external device in communication with that device, such that only a qualified card is considered acceptable. These card systems have become increasingly popular with hotels, industries, and even homeowners to better secure facilities. However, there is at least one major drawback to these systems.

Accepted card systems require the storage of magnetic data. This data is easily erasable, whether intentionally or unintentionally. Magnetic sources independent of the card can come into direct or proximal communication with the card, thus erasing the data kept on the strip. In addition, it is possible to utilize a false card reading device to extract the security, identification, and other data on the card, thus permitting an unauthorized and undesirable individual to obtain the sensitive data.

U.S. Pat. No. 5,552,587 (the '587 patent), issued to and owned by this applicant, addresses the inherent weaknesses of existing security devices and systems. The '587 patent is directed to a tubular key which rotates discs, whereby the rotation of the discs are read by a relatively complex fiber optic system. The counting results are fed to an external computer for processing. While the device described in the '587 patent is a vast improvement over past technologies and techniques, it is not without inherent problems. First, the fiber optic and corresponding circuitry generates undesirably high heat levels. Second, fiber optic technology requires cumbersome and time consuming calibration. Similarly, slight deviations in the optic alignment of the components from the desired calibration alters optic readings and corresponding accuracy of the units. As a result of deviations, additional calibrations are necessarily required. Third, processing functions for the lock claimed in the '587 patent are not housed locally with the lock, but rather are remotely housed. With none of the processing taking place locally at the lock, the overall efficiency of the unit is reduced and the costs become increasingly undesirable.

In addition to the cost of the fiber optic components and processing techniques, there are additional manufacturing costs associated with such a system. Precision manufacturing is required. Fiber optic systems require passageways through the lock components, such as the discs of the lock, such that light is permitted to pass through for reading by an optic component at one end of the opening. This necessitates highly precise tolerances in order to ensure that the light passageways are functionally sound to permit proper optical readings. Each of these requirements are necessary for the lock of the '587 patent to properly function. Undesirable manufacturing and configuration costs relating to both the lock components and the fiber optic components are an unfortunate, but necessary, barrier under such a fiber optic lock system.

Consequently, a security system is needed that will address many of the problems associated with current systems. The gross inadequacies of conventional locks, and the problems associated with fiber optic systems, must be avoided in providing a security system that can be manufactured, configured, and maintained at a reasonable cost. At the same time, increased security must be of the highest priority.

SUMMARY OF THE INVENTION

The optical security system in accordance with the present invention substantially solves the problems associated with traditional locks and lock systems, as well as the problems inherently present with fiber optic security locks. The present invention generally provides for a solid state optic lock system utilizing reflective infrared sensors for reading the rotational movement of a plurality of rotatably secure discs or wafers. The optic security system of the present invention generally employs standard electronic solid state components to minimize the manufacturing and configuration costs of the system. In addition, the use of these standard components permits simplified manufacturing and configuration for the lock components and, in particular, the discs being optically read by the system. The present invention can have beneficial use in transactional environments, including security, consumer, financial, and verification applications.

The present invention relates generally to an optical security system having a key, an optic lock, and a processing system. The lock generally has a plurality of optical reflective sensors, a plurality of readable discs, and a controller for processing information to and from the plurality of sensors. The optic security lock senses the surface changes of state during the rotation of the plurality of discs caused by the turning of the fully-engaged key. This results in a possible combination count of at least 24.9 billion. The data from the sensors is communicated to the controller, with the controller having a microprocessor capable of communicating data to and receiving data from the sensors. The processing system analyzes the data from the controller and compares the data to known information in a database for generating a lock command signal. The processing system can be encompassed within the controller-based microprocessor, or in an external remote processing device. The external remote processing device can be coupled in data communication with the controller for processing the data obtained from the lock, and for generating a corresponding lock command signal. Additionally, at least one external keypad device can be coupled in data communication with the controller and processing system for additional security verification before generating a corresponding lock command signal. The keypad enables further data entry for detailed purchasing and/or access information from a user as well.

It is possible to use the optical security system of the present invention to monitor and control access into private homes, commercial buildings, hotels, and the like. In addition to these entrance control applications, the system of the present invention can be utilized in any application where security verification is required. For instance, credit card access, consumer purchasing, and computer terminal or program access can be controlled by requiring an unlock lock command signal prior to granting permission. Any of the access or entrance requirements can be predicated on the requirement that a proper PIN be entered into the operable keypad, in addition to the proper rotation of an acceptable key within the optical security lock. Consequently, the lock command signal can be a signal to a security system or door lock, or it can be a signal to another computing or processing device, such as those used in processing credit card purchases, consumer purchase transactions or program access at a computer terminal. Further, the optical security system, and the processing system in particular, can be used to keep track of key usage, last use, number of uses by a user or key, and the like. This type of processed and stored data can be used for controlling the system, interpreting access or usage requests, and a myriad of other uses.

BRIEF DESCRIPTION OF THE DRAWINGS

FIGS. 9A, 9A-1, 9A-2, 9B, 9B-1, 9B-2 and 9C combined are a partial circuit diagram for a controller and security system in accordance with an embodiment of the present invention.

FIGS. 9D, 9D-1, 9D-2, 9D-3, 9E, 9E-1, 9E-2, 9F, 9F-1, 9F-2, 9F-3 and 9F-4 combined are a partial circuit diagram for a controller and security system in accordance with an embodiment of the present invention.

FIGS. 13D-1 and 13D-2 are a flow chart of one process of operation for a security system in accordance with an embodiment of the present invention utilized primarily in transactional environments.

DETAILED DESCRIPTION OF THE DRAWINGS

Optical Security Lock

Figure 1:
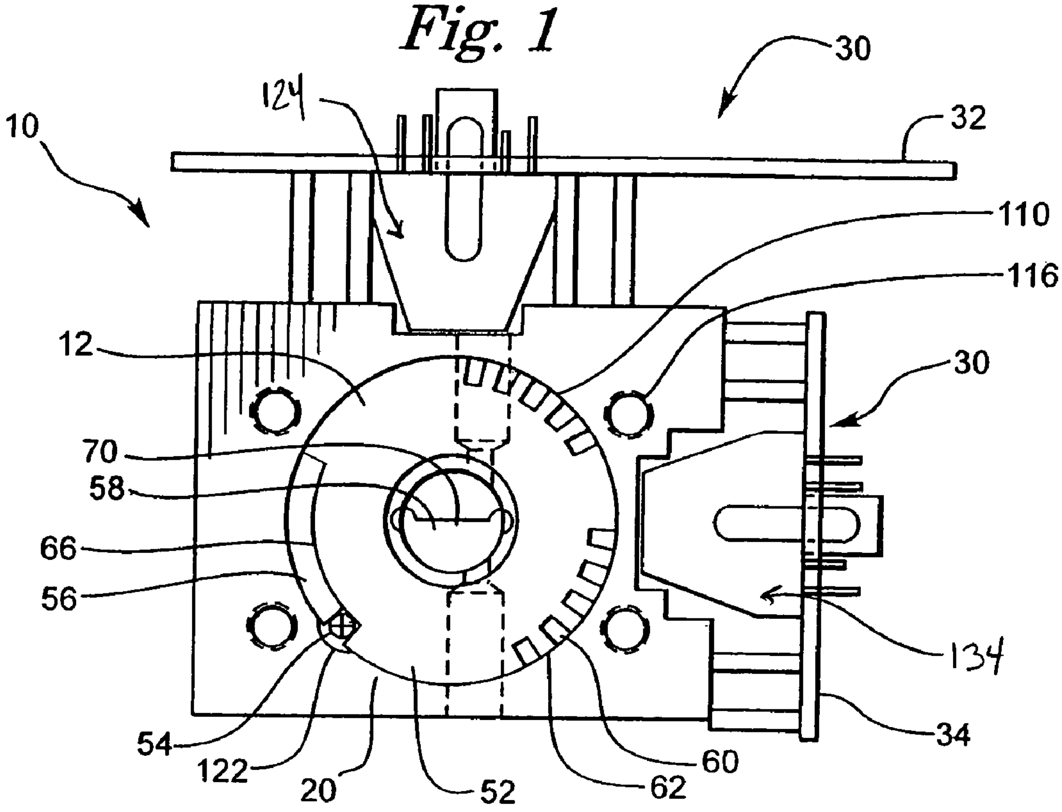
FIG. 1 is a front view of an optical security lock embodiment in accordance with the present invention.
Figure 7:
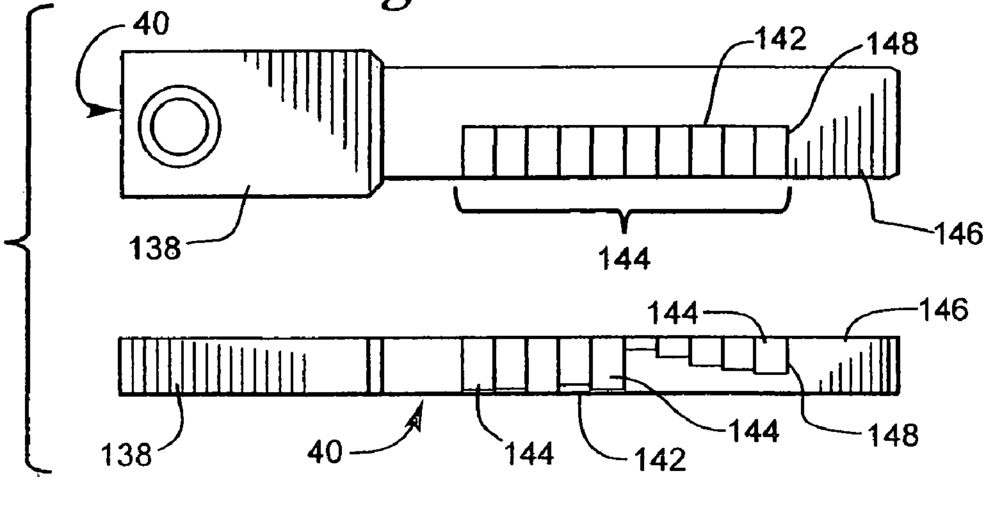
FIG. 7 is a key for use in accordance with an embodiment of the present invention.
Figure 12A:
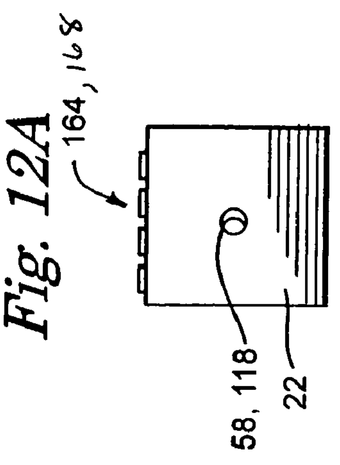
FIG. 12A is a side view of a system housing and a keypad in accordance with an embodiment of the present invention.
Figure 12B:
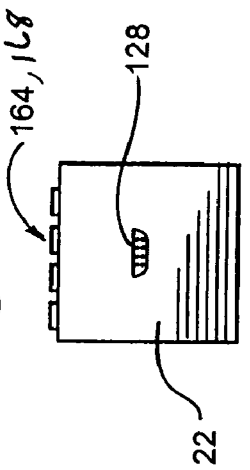
FIG. 12B is a side view of a system housing, a keypad, and a communication port in accordance with an embodiment of the present invention.

Referring to FIG. 1, an optical security lock 10 in accordance with the present invention is shown. The lock 10 generally includes a lock assembly 12, a lock housing 20, and a controller 30. In addition, there is at least one key 40, as shown in FIG. 7. The lock assembly 12, lock housing 20, and controller 30 are preferably housed within a system housing 22. The system housing 22 is shown in FIGS. 12A–12B.

Figure 2:
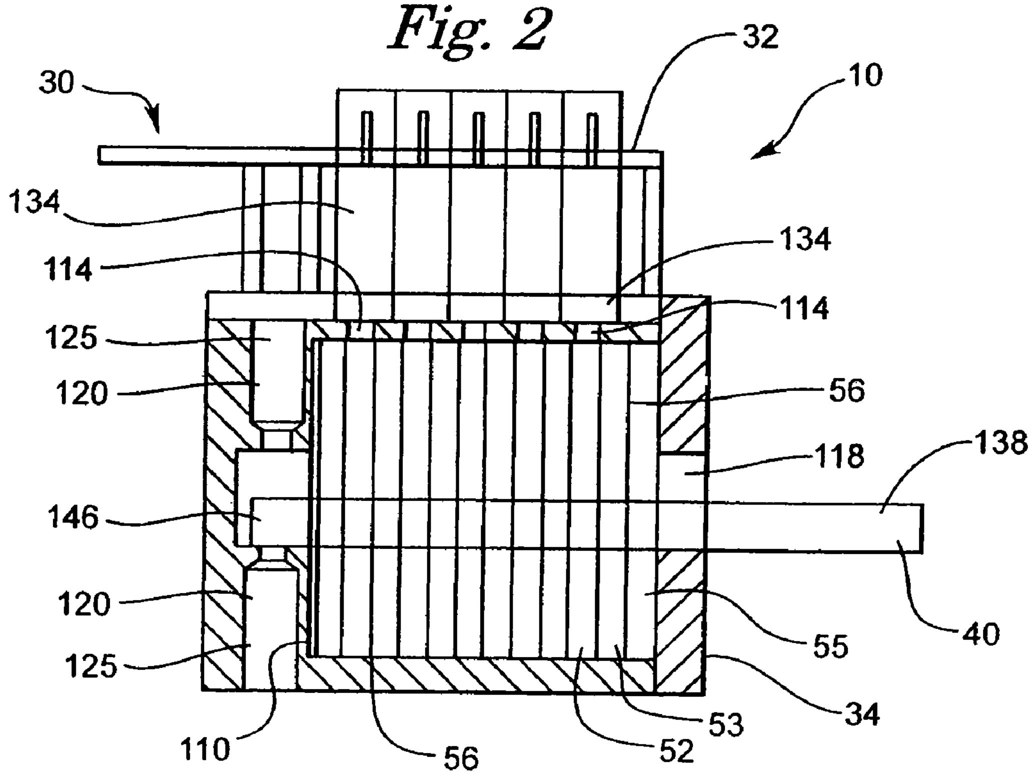
FIG. 2 is cross-section view of an optical security lock embodiment in accordance with the present invention.
Figure 3:
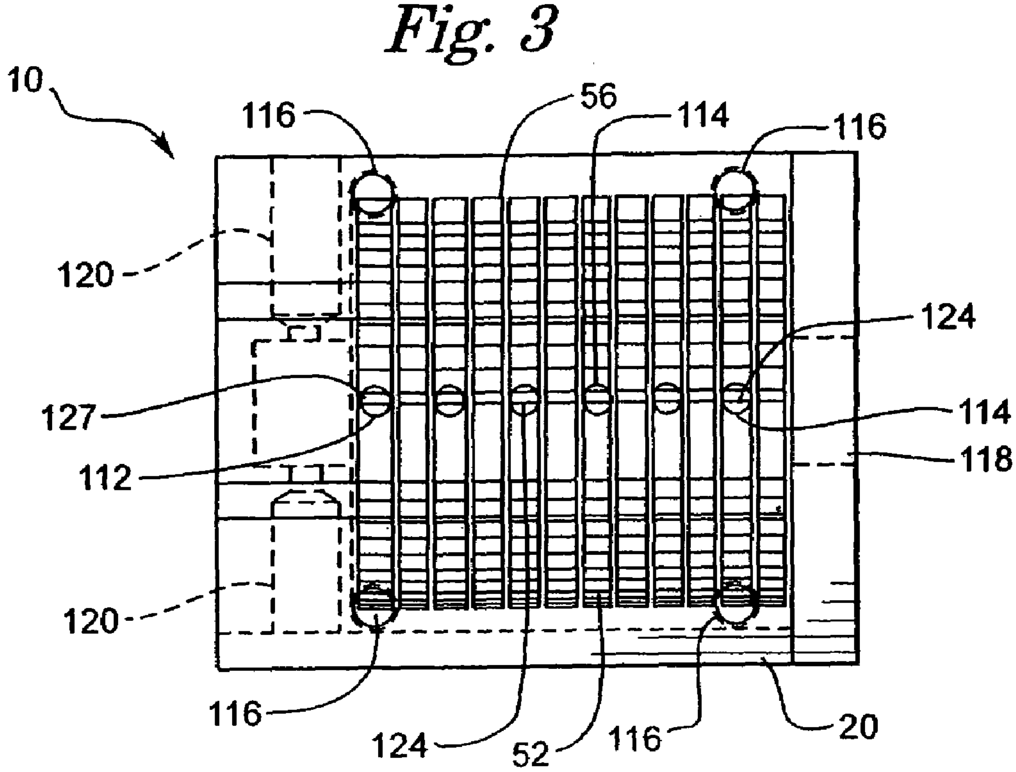
FIG. 3 is a cut-away view of the lock assembly and lock housing of an embodiment of an optical security lock in accordance with the present invention.
Figure 4:
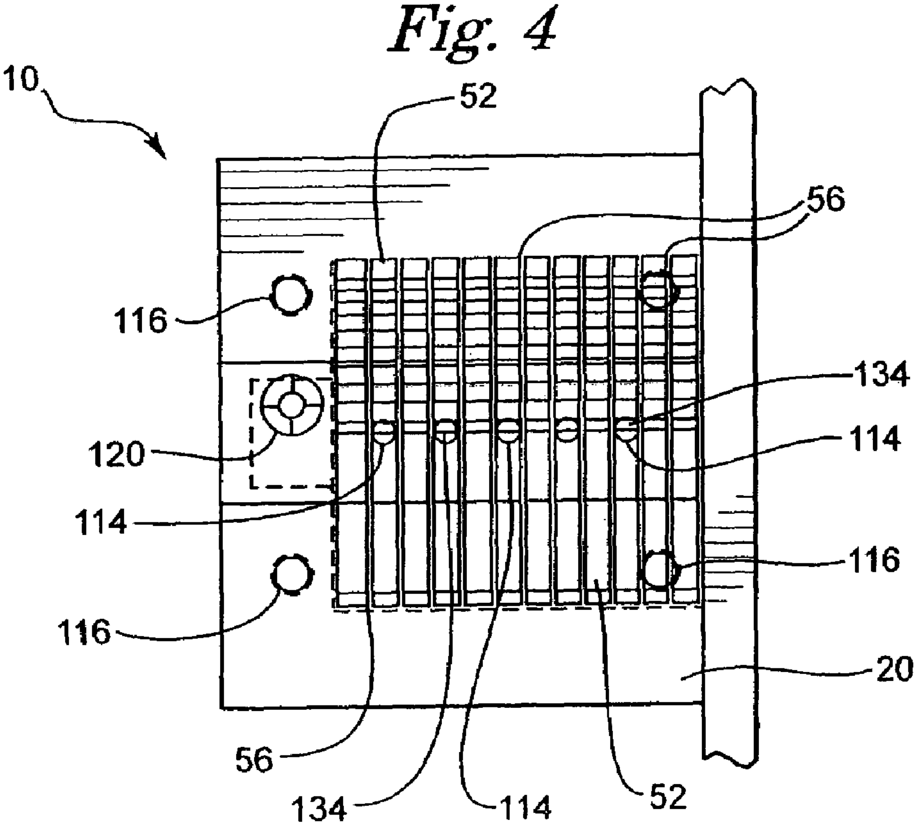
FIG. 4 is a cut-away view of the lock assembly and lock housing of an embodiment of an optical security lock in accordance with the present invention.
Figure 5:
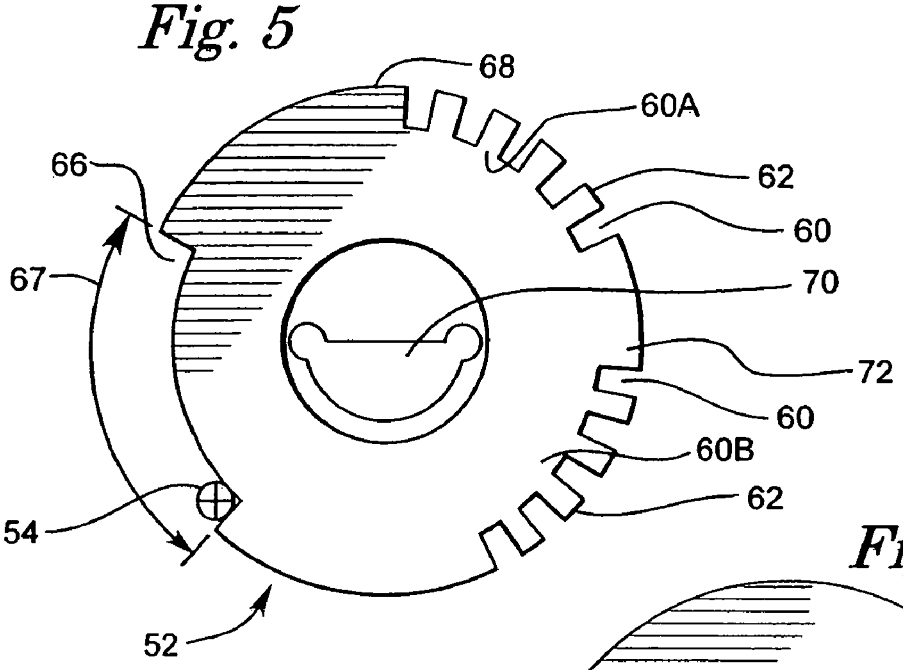
FIG. 5 is a rotatable disc or wafer for use in an embodiment of an optical security lock in accordance with the present invention.

Referring to FIGS. 1–6, the lock assembly 12 can include a plurality of rotatable discs 52, a stop pin 54, a plurality of spacing washers 56, and a key insertion aperture 58. Each of the plurality of discs 52 include a plurality of notches 60, a plurality of lands 62, a defined motion groove 66, a circumferential surface 68, an inner aperture 70, and an intermediate separation portion 72, as best shown in FIG. 5. In one embodiment, there are preferably 11 discs 52 made of aluminum, the aluminum material having innate light reflective qualities. These qualities can be enhanced by providing for polished aluminum. 10 of the discs are utilized for combination counts, with the $11^{th}$ disc 53 serving as a rotation count disc 53. While this disc 53 is shown in FIG. 2 as being assigned to one particular disc of the plurality of discs 52, it is envisioned that there are numerous discs of the plurality of discs 52 that could qualify and be appropriately designated as the rotation count disc 53. In addition, and as shown in FIGS. 2–4, there can be a spacer disc 55 that simply serves a spacing function to fill space within the housing 20, thus providing for a $12^{th}$ disc. Multiple spacing discs 55 can be utilized, or it is envisioned that this disc 55 can be completely removed to only permit the use of the 11 discs 52. Other disc counts and configurations are envisioned and can be employed without deviating from the spirit and scope of the present invention. The notches 60 are adjacently followed by the corresponding lands 62 to define a series of peaks and valleys referred to as readable changes of state. The changes of state are defined by the special reflective differences between each notch and corresponding land as will be disclosed in greater detail herein. The notches 60 can be anodized such that the reflective properties of the surface of the notches 60 are significantly minimized. Each of the lands 62 are without this coating or film whereby the lands 62 have the same surface reflection characteristics as the discs 52 and the circumferential surface 68. Other surface/structural techniques, and disc configurations, defining detectable changes of state can be employed without deviating from the spirit and scope of the present invention.

Referring again to FIG. 5, the plurality of notches 60 are preferably divided into a first group 60A and a second group 60B. The first group 60A and second group 60B are separated by the intermediate portion 72 of each of the discs. Preferably, the groups 60A, 60B are of equal number with each group having 5 notches and 5 lands, for a total of 11 changes of state per group.

Figure 6:
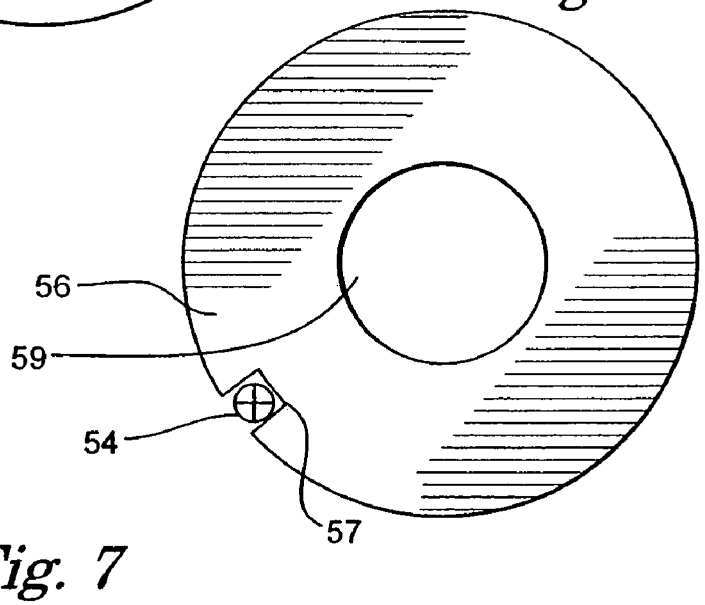
FIG. 6 is an intermediate washer for use in an embodiment of an optical security lock in accordance with the present invention.

Referring to FIG. 6, the spacing washers 56 have substantially the same outer diameter as that of the discs 52. The washers 56 also have a washer aperture 59 some size larger than the inner aperture 70 and a single depression 57 that is just larger than the diameter of the pin 54. The washers 56 are thinner than the discs 52 and are to serve as buffers between the discs 52. It is preferred that the washers 56 be made of a thin opaque non-reflective plastic material. Other acceptable materials are envisioned as well.

Still referring to FIGS. 1–6, the groove 66 of each of the discs 52 and the depression 57 of the washers 56 are sized for rotatable securement around the pin 54. Preferably, the discs 52 and the washers 56 are secured to the pin 54 in an alternating stacking manner with each washer being followed by a corresponding disc until a total of 11 washers and 11 discs are rotatably secured. The depth of the groove 66 and the depression 57 are approximately equal to the diameter of the pin 54. The circumferential arc length 67 of the groove 66 is a percentage of the total circumferential distance of the discs 52. This percentage is dependent upon the desired rotatable movement of the discs, whereby the pin 54 stops the rotation of the discs 52 at each end of the groove 66. Preferably, the circumferential arc length 67 of the groove 66 of each of the discs 52 is a distance permitting each of the lands 62 and notches 60 of each of the groups 60A, 60B to pass substantially through a single point of reference for each of the groups 60A, 60B upon a complete rotation of the discs 52 along the groove 66. Such preferred movement permits corresponding sensors to read exclusively from one group of notches 60 and lands 62, and consequently, to sense distinct changes of state data for each group.

The sequential securement of the discs 52 and washers 56 to the pin 54 results in the alignment of the inner apertures 70 of the discs 52 and the washer apertures 57 of the washers 56, thus defining the boundaries of the key aperture 58 for insertion of the at least one key 40.

As best shown in FIGS. 1–3, the lock housing 20 generally has a lock chamber 110, a count aperture 112, sensor apertures 114, mounting apertures 116, a key opening 118, a trigger aperture 120, and a pin groove 122. The lock chamber 110 is sized for rotatable resting securement of the stacked discs 52. The discs 52 are contained while still able to rotate, as is discussed herein. The mounting apertures 116 enable mounting of the lock housing 20 to the system housing 22, and permit the mounting of various boards, the controller 30, and the like. Mounting apertures 116 are available on at least two sides of the housing 20. The trigger aperture 120 defines a light communication channel at one end of the lock chamber 110, with the channel of the trigger aperture 120 extending out through both sides of the chamber 110 for use by a corresponding key trigger sensor 125. The pin groove 122 rotatably secures the ends of the pin 54 within the lock housing 20 whereby the rotation of the discs 52 and washers 56 is contained around the circumference of said pin 54.

Figure 8:
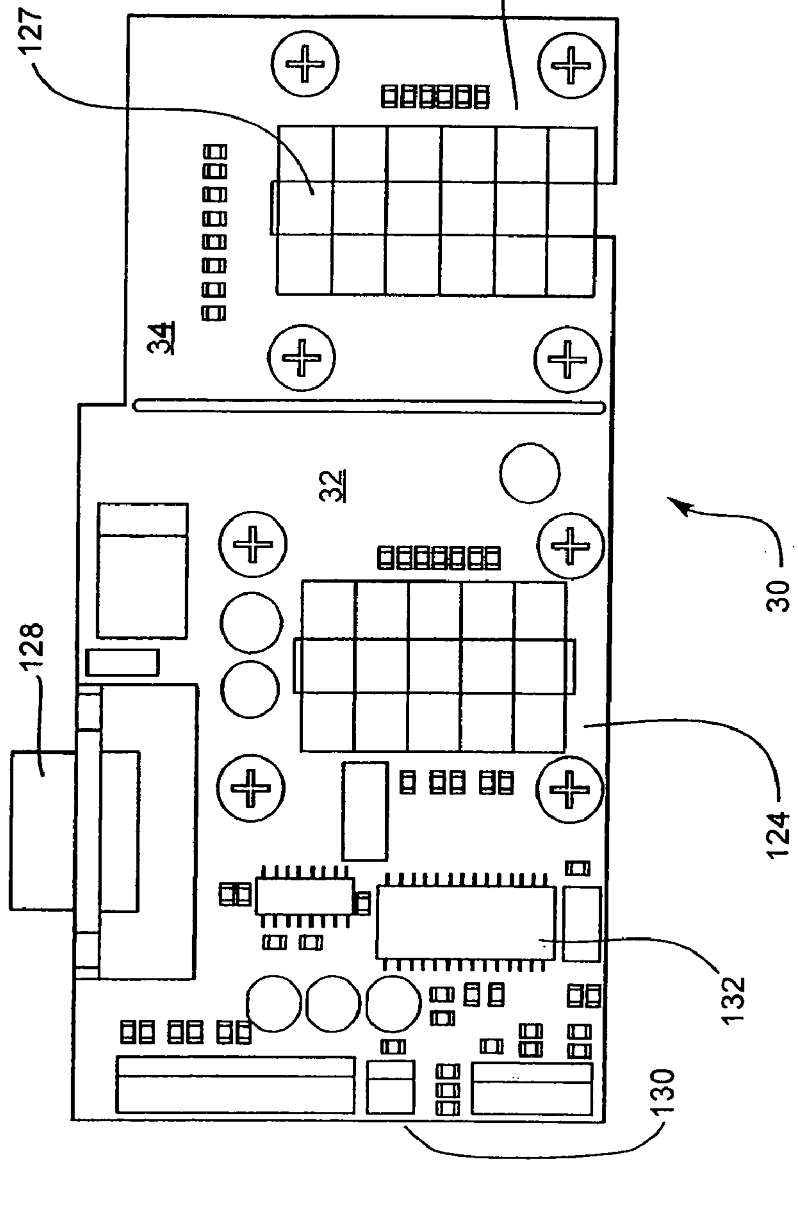
FIG. 8 is a circuit board diagram of a controller in accordance with an embodiment of the present invention.
Figure 9A:
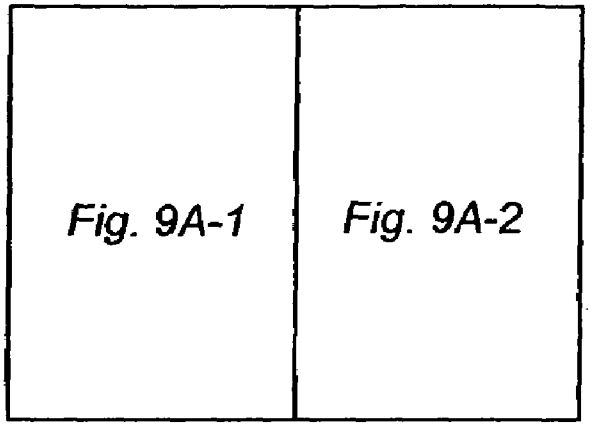
Figure 9B:
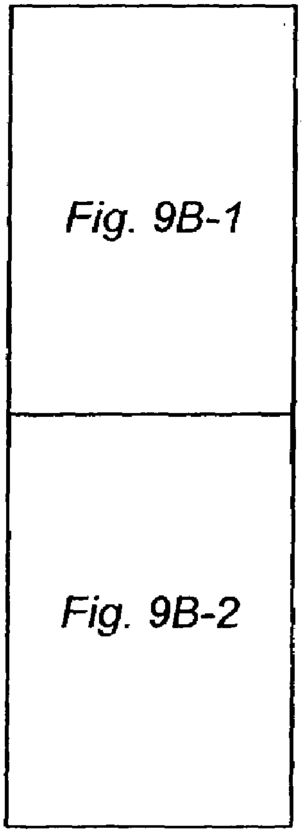
Figures 1, 9A:
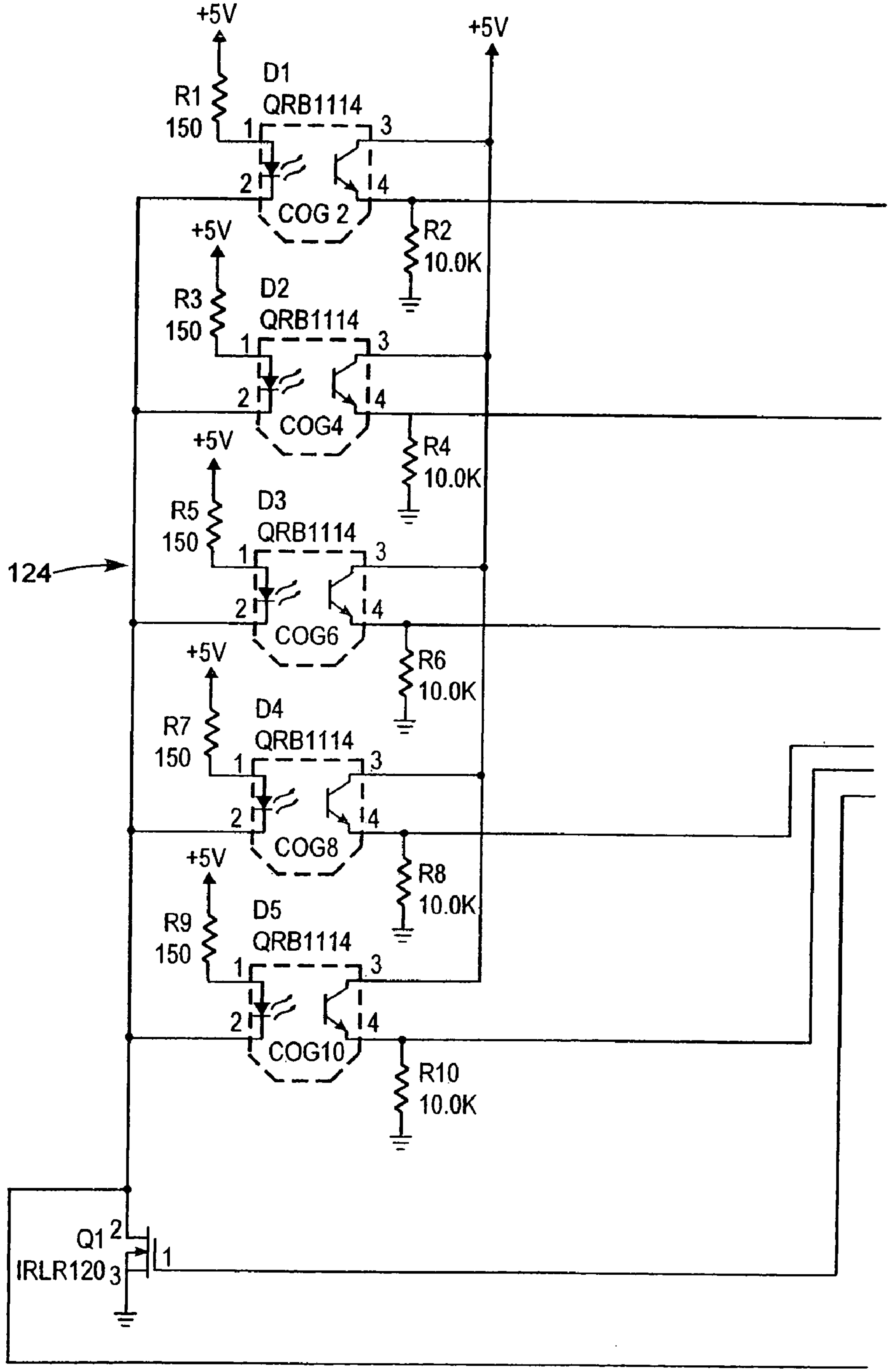
Figures 2, 9A:
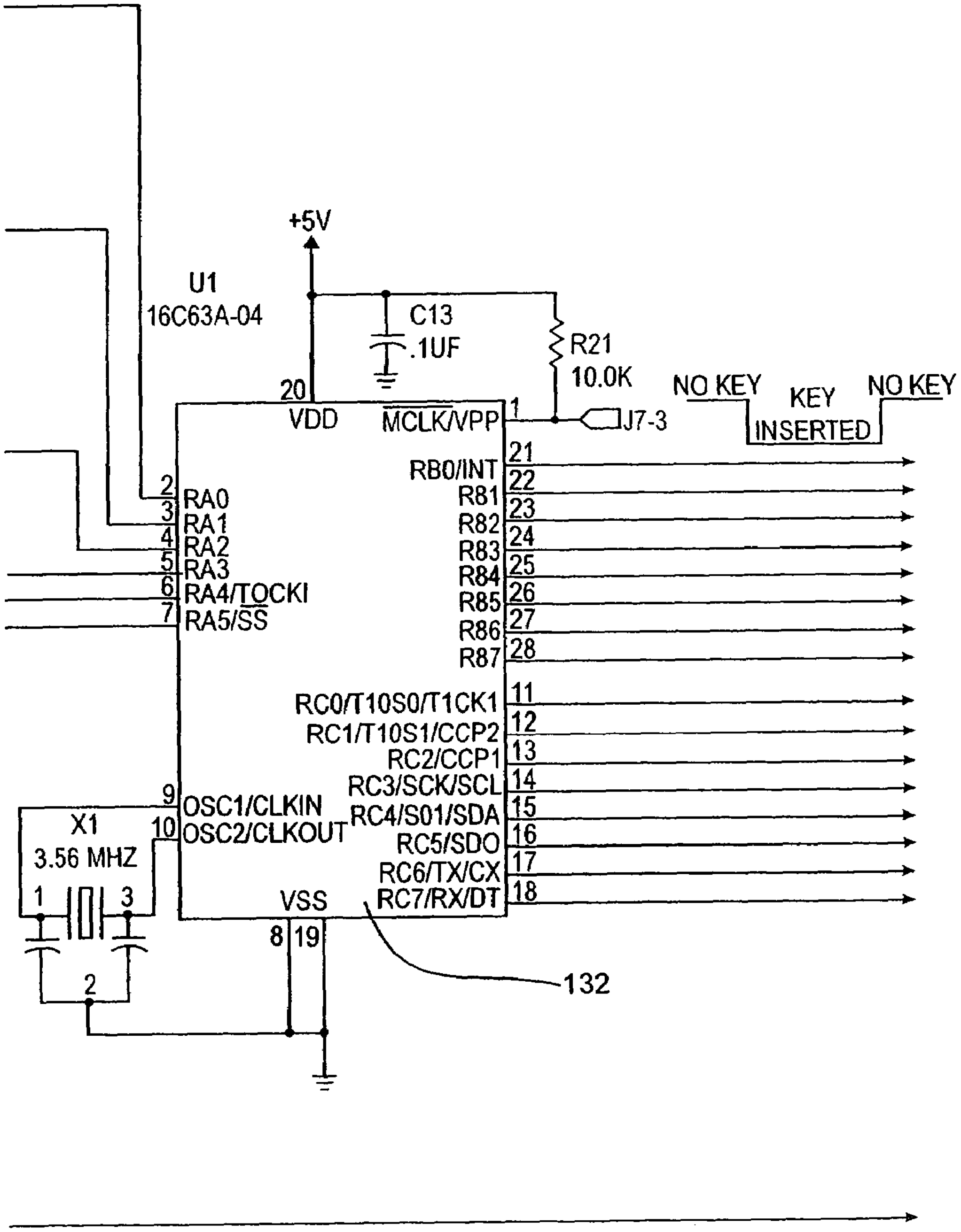
Figures 1, 9B:
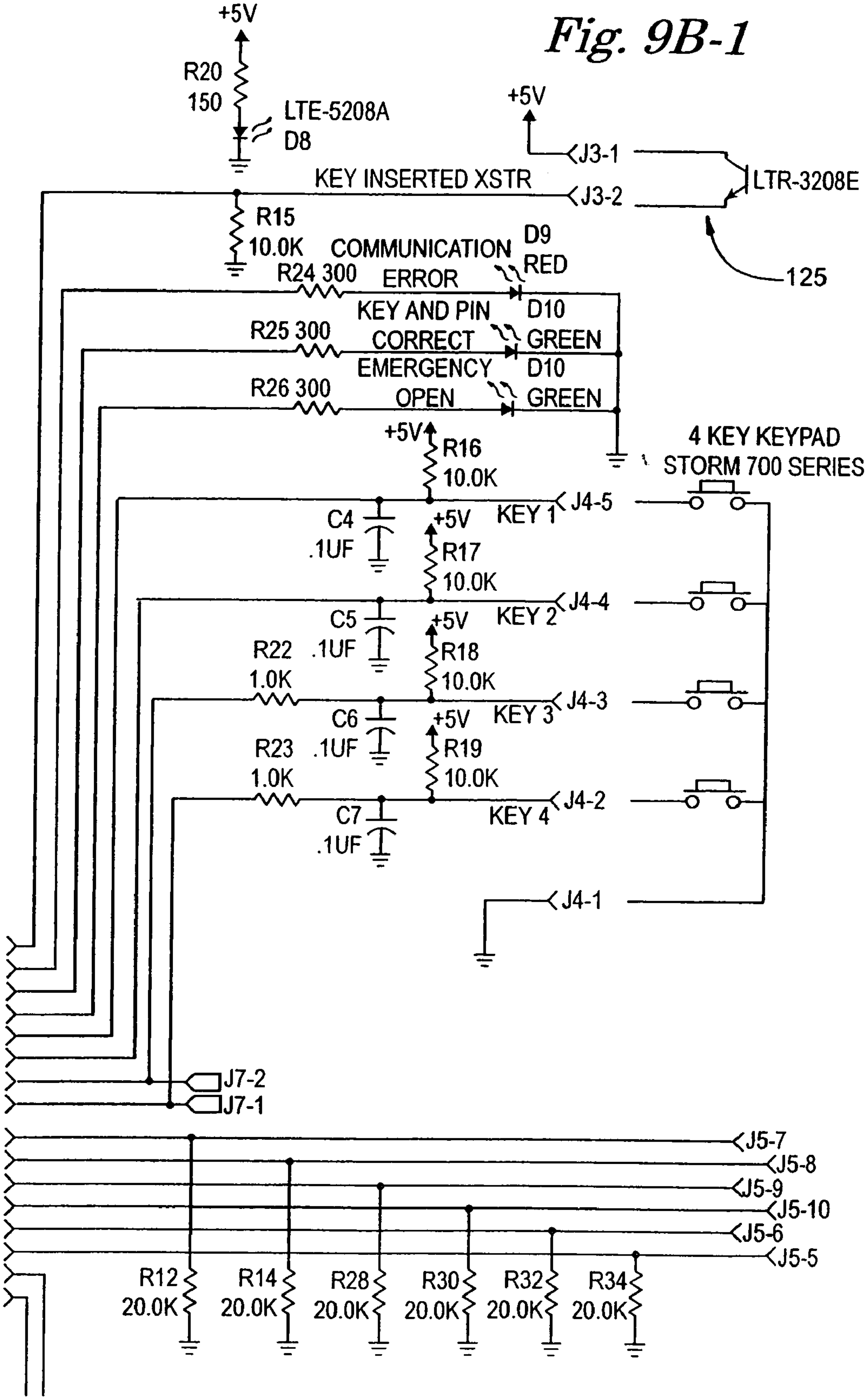
Figures 2, 9B:
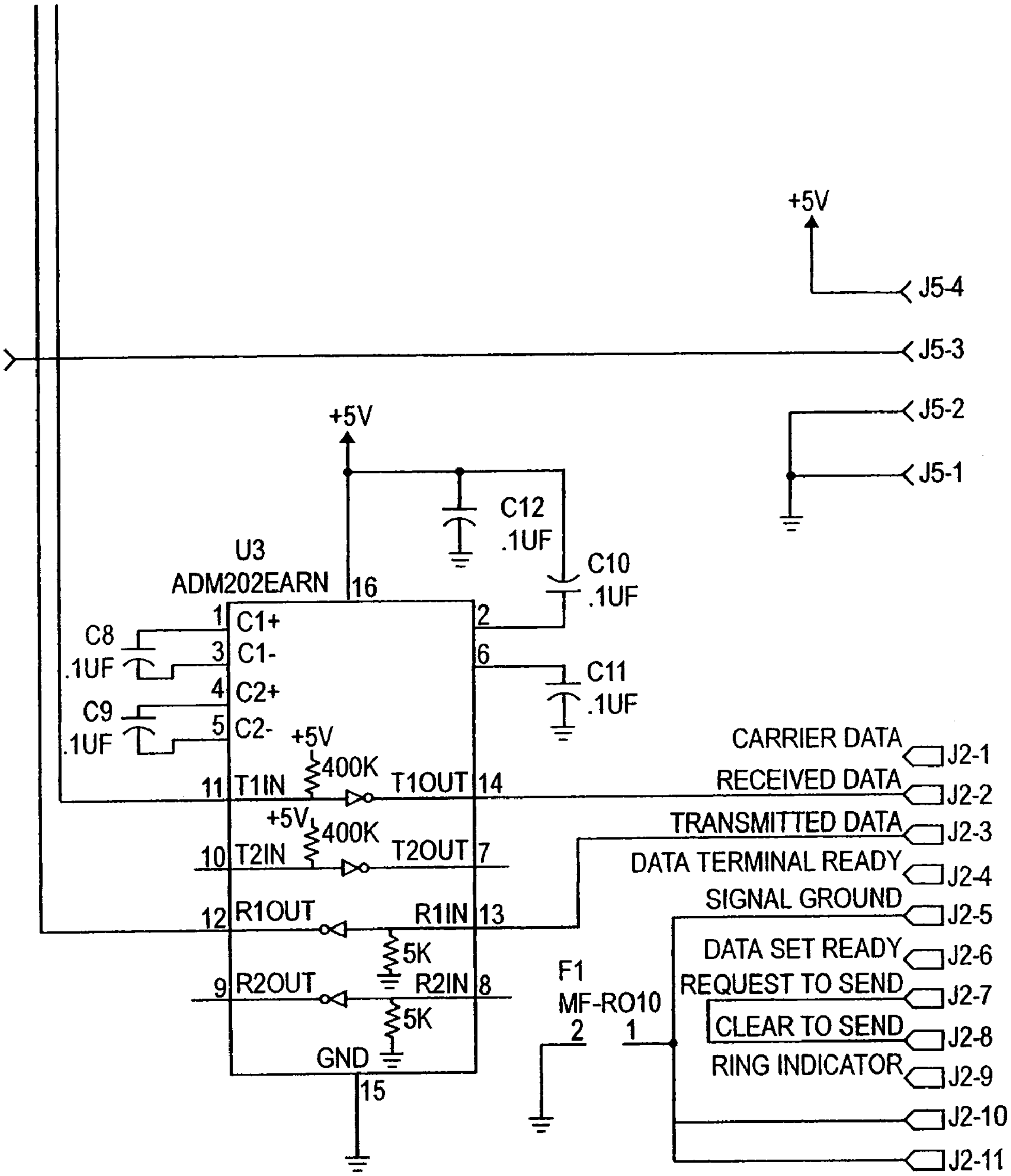
Figure 9C:
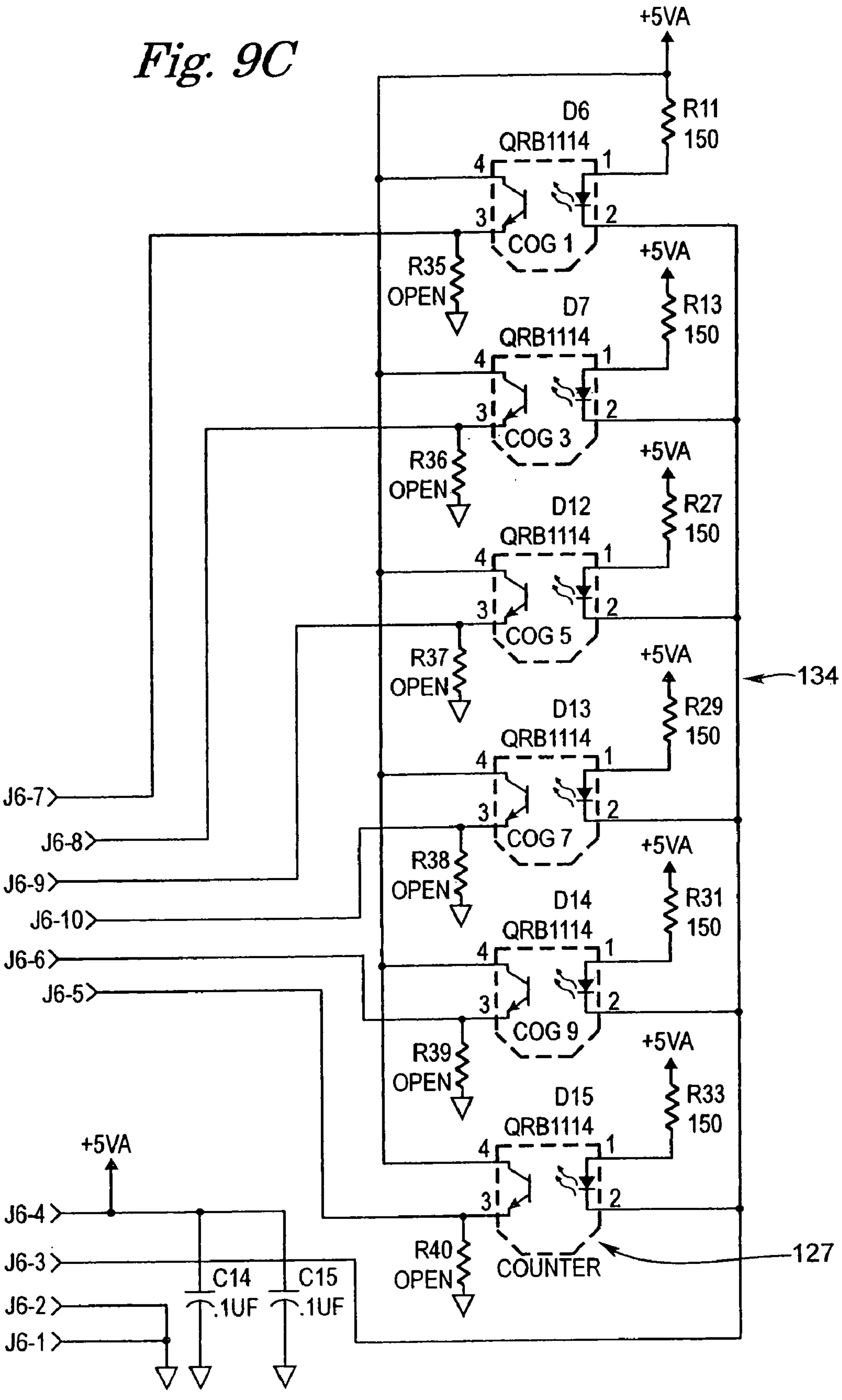

Referring to FIGS. 1, 2, and 8, the controller 30 generally comprises a first circuit board 32 and a second circuit board 34 which can be mounted to the outside of the lock housing 20, within the system housing 22. Other board, mounting, and connectivity combinations and configuration are also possible. The first circuit board 32 can include a plurality of sensors 124, a communication port 128, control circuitry 130, and an on-board processor 132. The second circuit board 34 can include a plurality of sensors 134 and controller lines for communication with the first circuit board 32. FIGS. 9A–9C combined show the circuit diagram for one embodiment of the controller 30 and system. One of the plurality of sensors from one of the circuit boards 32, 34 is designated as the key trigger sensor 125 and another is designated as a total rotation sensor 127 (FIG. 3). The remaining of the plurality of sensors 124, 134 are aligned to read the changes of state of the discs 52 through the plurality of sensor apertures 114. Preferably, the sensors 124, 134 are aligned for reading changes of state from a corresponding group of notches and lands 60A, 60B. For instance, sensors 124 can be aligned to read the changes of state associated with the rotation of group 60A, and sensors 134 aligned for the reading of the changes of state for group 60B, or vise versa. It will be understood by those skilled in the art that other variations of this grouping can be employed without deviating from the spirit and scope of the present invention. Further, various optical and like sensors for sensing surface changes and/or movement are envisioned for use with the present invention.

Referring again primarily to FIGS. 1–4 and 8–9F, the key trigger sensor 125 is comprised of distinct infrared emitting diode (IED) and phototransistor parts for reading of a designated triggering segment 146 of the key 40. Each of the distinct components are located opposing each other at end portions of the trigger aperture 120. The remaining sensors 124, 134 are reflective object sensors having both an IED and a phototransistor built into the sensors 124, 134 for communication with the processor 132. The optimal reflective distance from the surface of the sensors 124, 134 to the reading surface of the discs 52 is approximately 0.15 inches. It will be understood by those skilled in the art that other sensors and configuration parameters can be substituted for the disclosed sensor specifics without deviating from the spirit and scope of the present invention. The communication port 128 in one embodiment is a RS232 serial port. Additionally, USB, infrared, parallel, SCSI, RF or other wireless techniques/protocols, USART, and a myriad of other accepted communication protocols can be implemented in other embodiments.

Referring to FIG. 7, the at least one key 40 includes a handle portion 138, and an operating portion 142. The operating portion 142 comprises a plurality of angular segments 144, a triggering segment 146, and a counting segment 148. The angular segments 144, the triggering segment 146, and the counting segment 148 can be positioned differently on the key depending on the desired alignment with the discs 52, the trigger sensor 125, and the disc designated for rotation counts, respectively. The segment locations disclosed in the figures and this description are envisioned for an exemplary embodiment and are not intended to limit the scope of the present invention. The key 40 can be constructed of aluminum, brass, and the like. Other materials are also envisioned. Each of the angular segments 144 is machined to form predetermined angular turning states, with each segment determining the rotation of a corresponding engaged disc of the plurality of discs 52. The angular states can be oriented at 6.5 degree increments. The triggering segment 146 is located such that it aligns with the trigger sensor 125 upon a substantially complete engagement of the key 40 into the key aperture 58. The counting segment 148 is located such that it aligns with a disc 53 designated for rotation count and the corresponding total rotation sensor 127. The counting segment 148 is substantially non-angular to permit complete rotation of the corresponding disc to provide a count of the total rotational movement of said disc. It will be understood by those skilled in the art that other sized discs 52, angular cuts on the key 40, and/or other size, angular, and dimension changes could be made to the present invention to alter the potential sensing parameters for the changes of state and rotation of the discs 52 without deviating from the spirit and scope of the invention.

In operation, an end user inserts the key 40 through the key opening 118 of the lock housing 20 and into the key insertion aperture 58 of the lock assembly 10 such that the operating portion 142 of the key 40 is in rotational alignment with the plurality of discs 52. At the position of complete engagement, each of the angular segments 144 is aligned with a corresponding one of the discs 52, the counting segment 148 is aligned with the one disc 53 designated for counting rotational movement of the key 40, and the triggering segment 146 is aligned with the trigger sensor 125. Once engaged, the trigger sensor 125 detects key 40 insertion. The phototransistor for the trigger sensor 125 is on until the key 40 blocks the infrared path between the IED and the phototransistor. At the moment of path blockage the phototransistor is turned off and communication is made to the processor 132 and the input/output line to the processor 132 goes low. Without this complete engagement detection by the trigger sensor 125 and the processor 132, rotational movement of the discs 52 will not be acknowledged by the processor 132.

In one embodiment, the size of the infrared sensors 124, 134 are such that they are generally larger than the thickness of any one of the discs 52, as shown in FIG. 2. Consequently, the notches 60 and lands 62 are grouped into groups 60A and 60B and separated by the intermediate portion 72 such that each group of sensors 124, 134 reads from a corresponding group of notches and lands, as shown in FIG. 5. Generally, only one group of sensors, i.e., sensors 124 or 134, will read changes of state from one group of notches and lands per disc, i.e., groups 60A or 60B. In another embodiment, smaller reflective sensors could be implemented for sequential one-to-one alignment with the discs 52. In this alternative embodiment, multiple groups of notches and lands on any one of the discs 52 could be read to further increase the possible changes of state counts.

Rotation of the key 40 is capable of rotating the engaged discs 52 a maximum rotatable distance allowed by the start and stop positions of the interacting pin 54 and groove 66. The angular segments 144 and the counting segment 148 of the key 40 dictate the allowable rotatable movement of each of the engaged discs 52 within the maximum rotatable distance controlled by the pin 54 and the arc 67 of the groove 66. The 6.5 degree increment cut of a segment substantially corresponds to the rotatable movement from one notch 60 to one land 62, or vise versa. Further, the incremental angular states each define the rotatable movement between a notch 60 and land 62. The larger the machined angular cut of a particular segment, the shorter the rotational movement of the corresponding engaged disc upon rotation. For instance, a substantially non-angular segment will immediately engage the corresponding disc 53 upon rotation to permit complete rotation of that disc 53 with a maximum rotation of the key 40, thus passing each of the grouped notches 60 and lands 62 in front of the corresponding sensor. Similarly, a segment with a large angular cut will not immediately engage the disc upon rotation of the key 40, and will thus only move a reduced number of notches 60 and lands 62 in front of the corresponding sensor with a complete rotation of the key 40.

Each sensor 124, 125, 127, 134 is in operable communication with the processor 132 through a distinct input/output line. As the notches 60 and lands 62 pass in front of the corresponding aligned sensor, the signal to the processor 132 changes. When the reflective surface of a land 62 passes in front of the sensor the output to the phototransistor is turned on and the input to the processor 132 is high. When the non-reflective surface of a notch 60 passes in front of the sensor, the output to the phototransistor is turned off and the input to the processor 132 is low. The cumulative high and low signals to the processor 132 for each sensor are stored in memory and define the changes of state count for a particular rotated disc as read by a corresponding sensor. Consequently, this results in a possible combination count for the lock of 24.9 billion. Those skilled in the art will understand that different combination counts can be arrived at by following variations and embodiments described herein and known to those skilled in the art.

The substantially non-angular counting segment 148 of the key 40 is preferably distal from the handle portion 138. This counting segment 148 will substantially rotatably move the corresponding disc a complete rotation such that all of the notches and lands of one of the groups 60A, 60B pass in front of the total rotation sensor 127. This allows the processor 132 to monitor whether or not a complete rotation of the key 40 has occurred. If a complete rotation has not been detected by the rotation sensor 127 the processor 132 will flag an erroneous key rotation and will not permit an unlock or approval signal, regardless of the changes of state counts received from the sensors 124, 134. This denied unlock signal will be the generated command lock signal for this improper rotation.

The processor 132 can be programmed to perform the database comparison and processing functions of a processing system in accordance with an optic security system 159, as described herein. The processing system is where the database comparison functions are performed. The data from the sensors 124, 127, 134 is compared with a database of the changes of state counts corresponding to each individual accepted and programmed key 40. The changes of state counts for acceptable keys 40 are programmed and compared to the cumulative changes of state received from the sensors 124, 127, 134 upon complete rotation. If the changes of state data from the rotation sensor 127 is acceptable and the changes of state data from the sensors 124, 134 aligned with each corresponding disc match those data values stored in the processing system, the processor 132 in this embodiment, for an acceptable key, the processor 132 outputs an unlock or approval signal. In one embodiment, the keys are programmed, a database is maintained, and processing is done at this on-board processor 132. Such a processor 132 could store and maintain one-time values for a limited number of acceptable keys, or preferably, will be reprogrammable with the use of flash ROM technology built into the processor 132. It is envisioned that other reprogrammable microprocessors and configurable or programmable hardware understood by those skilled in the art can be utilized as well. The addition or subtraction of keys and their assigned changes of state counts is possible with such a reprogrammable processor 132. In another embodiment, as will be discussed in greater detail herein, predetermined storing and processing functions of the processing system, and the overall security system 159, are performed by an external remote processing device 160 operably linked to the controller 30 of at least one lock 10 via the communication port 128.

Optical Security System

In the optic security system 159, it is possible to do the comparison and database processing functions at the processor 132. Alternatively, it is possible to operably incorporate the external remote processing device 160. This remote processing device 160 will generally be any computer system such as those most commonly understood in the art to run common, and specialized, software programs for database maintenance, communication routines, consumer and financial transactions, and the like. Other transactional, security and verification applications known to one skilled in the art can employ the present invention as well. This external processing device 160 is remote to the security lock 10 and is capable of maintaining and controlling communication data links with a single lock 10, or with a plurality of the communication ports 128 of a plurality of individual locks 10.

The external processing device 160 generally has a powerful microprocessor, memory, input/output lines, a reprogrammable data storage device, and a display for increased data input and output, comparison functions, and database control routines. The display can further include a plurality of displays. For instance, one display could be in operable communication with the lock 10, at the physical location of said lock 10. In addition, or as an alternative to this display location, a display can be at the location of the remote processing device 160. The use of this external processing device 160 not only provides an opportunity to increase the functions of the individual locks 10 in comparison to the on-board processor 132, but it also provides a centralized and universal control sight for monitoring, communicating to, maintaining, and controlling each and every linked optic security lock 10. When centralized remote processing devices 160 are linked to multiple locks, each lock 10 will be assigned an identification number to be transmitted with data in the system 159 whereby database processing and programming can be individualized for each lock 10. This identification number will be stored in the processor 132 of each lock 10 and transmitted through the port 128 by the controller 30.

Figure 10:
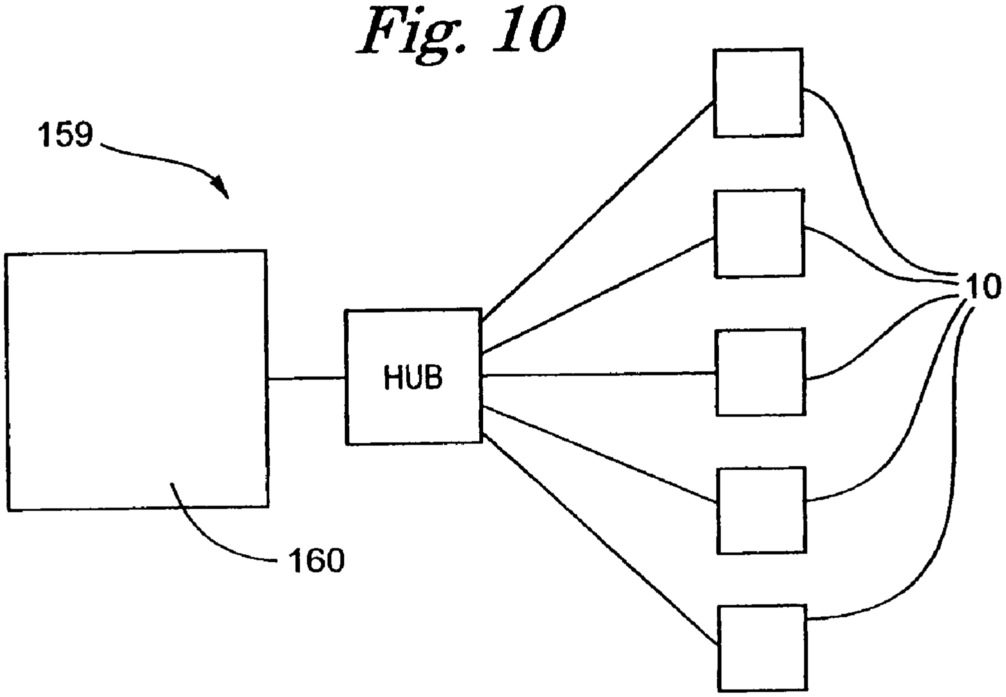
FIG. 10 is a block diagram of an embodiment of the security system in accordance with the present invention.
Figure 11:
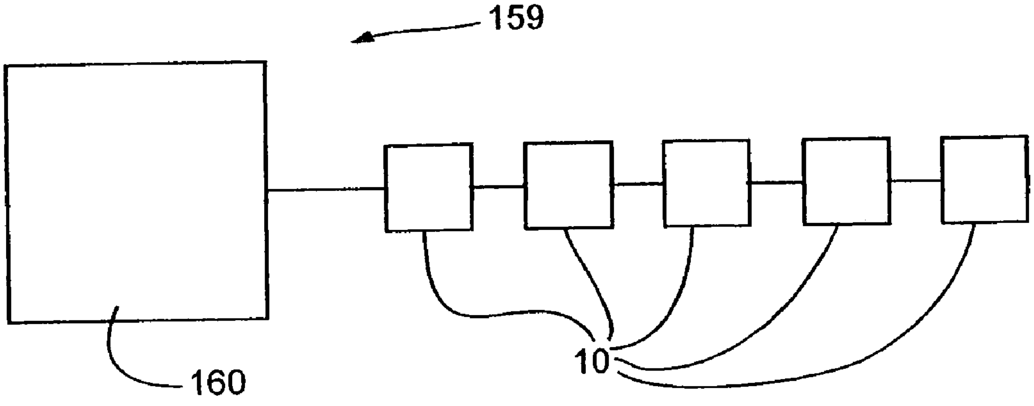
FIG. 11 is a block diagram of an embodiment of the security system in accordance with the present invention.

There are numerous methods and techniques which can be implemented for establishing communication between the centralized processing device(s) 160 and a plurality of the individual locks 10. FIG. 10 demonstrates the use of a hub topology, whereby each operably connected lock 10 is in communication which the remote device 160 through the hub. In addition, FIG. 11 demonstrates a sequentially linked communication system, whereby communication between the operably connected locks 10 and the remote device 160 is facilitated by the continuous connections between each of the locks 10 and the one central remote device 160. Each individually identified lock 10 serves essentially as a relay for data to and from locks 10 further down the communication chain from the remote device 160. Other wireless and wired communication topologies understood for transmitting data between centralized devices and a plurality of remote devices are envisioned as well and can be implemented without deviating from the spirit and scope of the present invention. RF, and various accepted wired and wireless networking techniques are additionally envisioned. Each of these communication techniques and topologies is generally made possible by the individual identification numbers assigned to, and transmittable to and from, each of the locks 10 within the security system 159.

Generally, if the external processing device 160 is implemented, the processor 132 on the security lock 10 will perform minimal comparison database functions, and will instead serve primarily as a data receptacle for communication on to the processing device 160 for further processing. In such a configuration, the acceptable key 40 changes of state data are programmed and reprogrammed into the remote processing system 160 rather than the on-board processor 132. The processor 132 accepts and records in memory the changes of state data from an inserted key upon complete rotation, and communicates this data to the processing device 160. The device 160 then searches the database to determine whether or not the key 40 read at the lock 10 is an acceptable key within the device 160 database. If the key is not in the database, a key denial signal is sent back to the lock 10 as the lock command signal, which in turn, will not output an unlock signal, but rather a key failure signal for use in denying access.

In one embodiment, the system 159 will include at least one keypad device 164 in operable communication with the lock 10, as shown in FIGS. 12A–12B. Preferably, the keypad 164 is attached to the housing 22 of the lock 10. This keypad 164 is generally on the outer portion of the housing 22 whereby access to the key aperture 58 and the keypad 164 is available. Alternatively, the keypad 64 can be remotely mounted or in close proximity to the lock 10. The keypad 164 can be utilized with both the processor 132 based system, or the system utilizing the external device 160 by way of a communication link to the controller 30 of the lock 10. The keypad 164 can utilize a myriad of key digits. In a preferred embodiment, the number of physical key digits for one keypad device 164 is four, as illustrated in the figures.

Figure 9D:
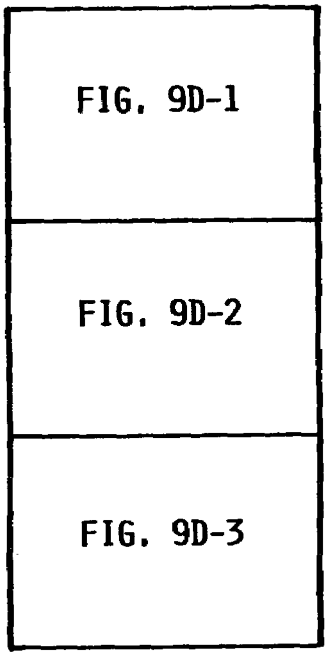

Alternative embodiments may include at least one keypad device 168, individually or in combination with device 164, comprising a plurality of keys 170 defining a key switch matrix 172, as demonstrated in FIG. 9D. The matrix 172 of FIG. 9D provides schematic representation of the keys 170 and entry systems of both input devices 164, 168 to the processor 132. As with any of the embodiments, LCD control circuitry 174 can also be employed to display procedural prompting, transactional approval, and the like. Similar to the embodiment described and shown in FIGS. 9A–9C, the alternative controller and circuitry embodiment of FIGS. 9D–9F include the sensors 124, 125, 127, and 134 in operable communication with the processor 132. However, this embodiment can further include the operable connection of the keypad device 168 and the corresponding key switch matrix 172 to the processor 132 to process data in conjunction with the four pin keypad inputs 164. This expanded keypad entry system 168 enhances the implementation of the present invention in consumer transaction environments such that purchasing data and user identification and security data can be inputted and processed during use of the lock 10 to improve buyer verification and transactional security. The 5×4 matrix 172 scheme of this embodiment of the device 10 can be used to reduce the number of I/O (Input/Output) lines required for operable electrical connection to the processor 132 to determine key actuation activity. Such a configuration allots 5 columns 170*a* and 4 rows 170*b* for communication to the processor 132. In other embodiments, each key switch input, for each input device 164, 168, could have a separate I/O line to the processor 132 to determine when a key is pressed. Specifically, 16 lines for the keypad device 168 and 4 lines for the pin device 164 could be operably connected to the processor 132.

Figure 9E:
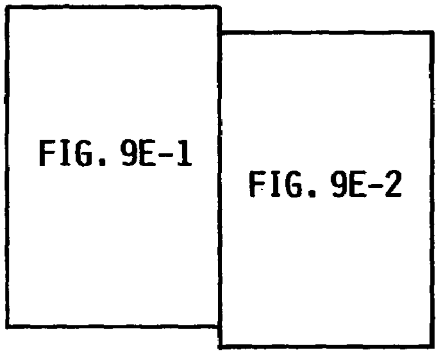
Figure 9F:
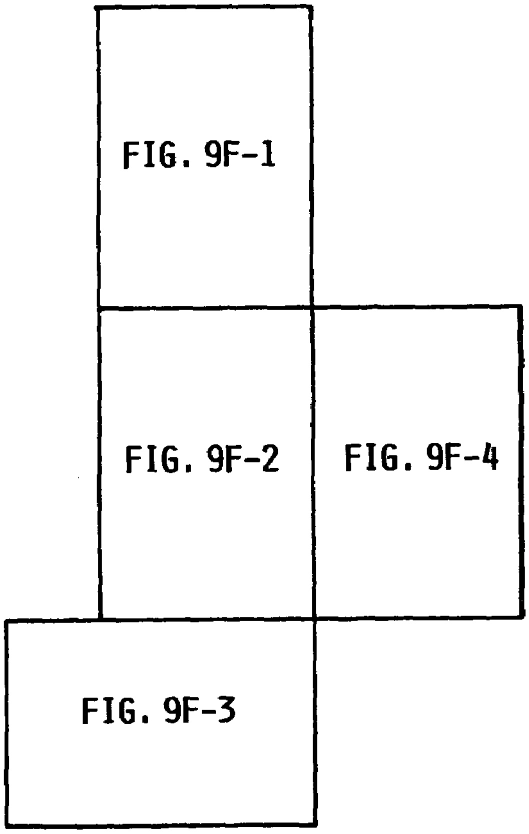
Figures 1, 9D:
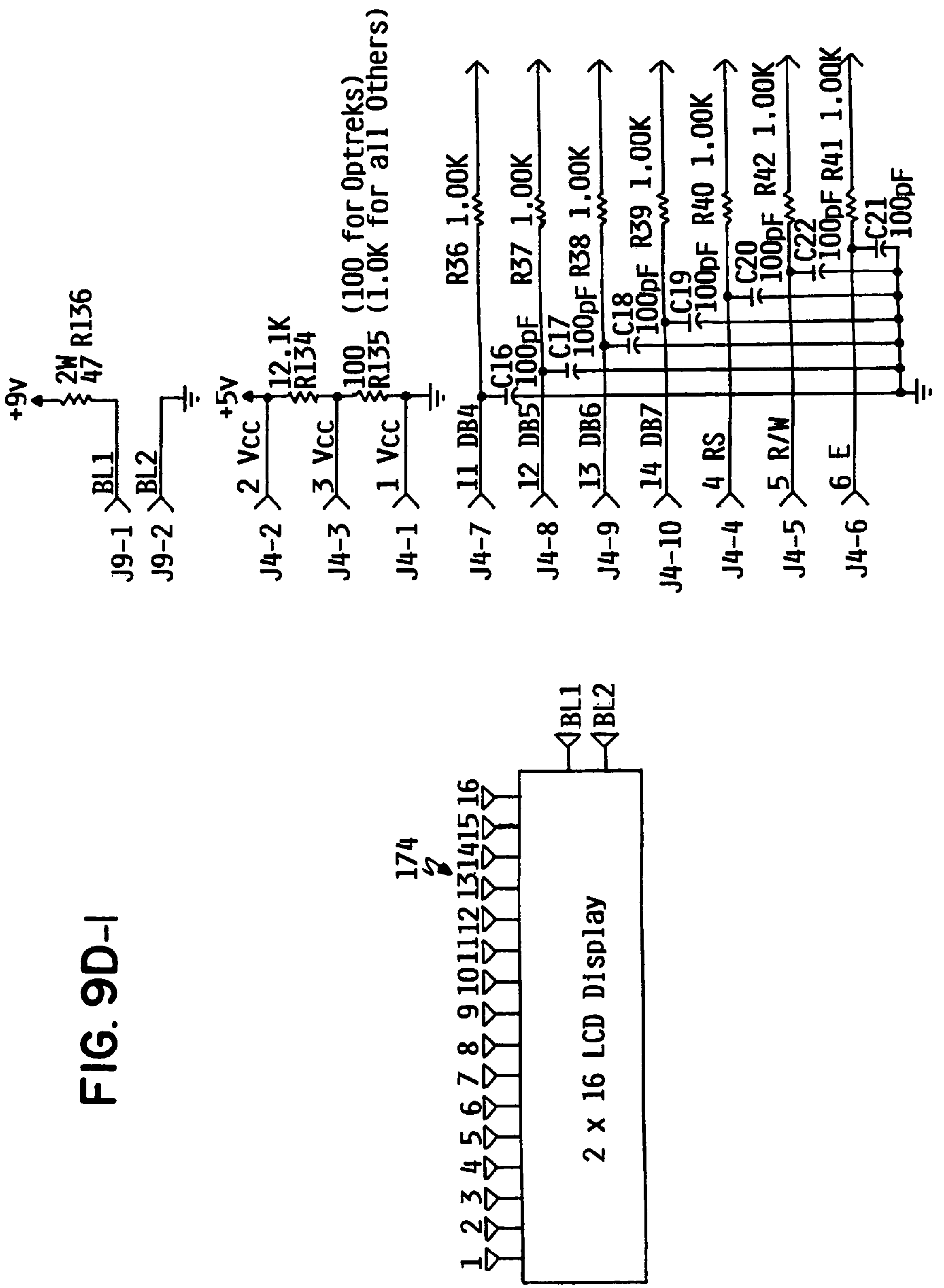
Figures 2, 9D:
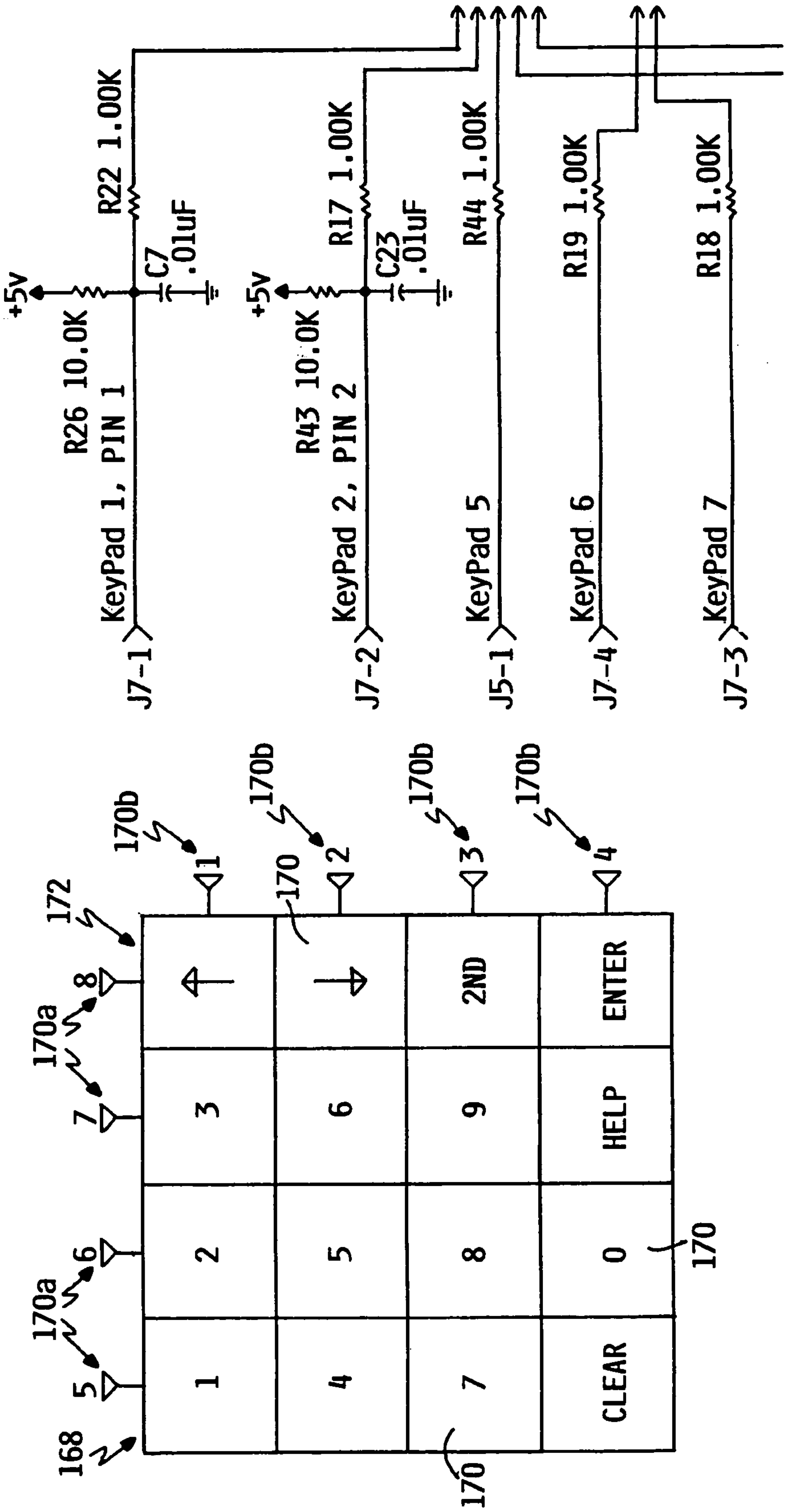
Figures 3, 9D:
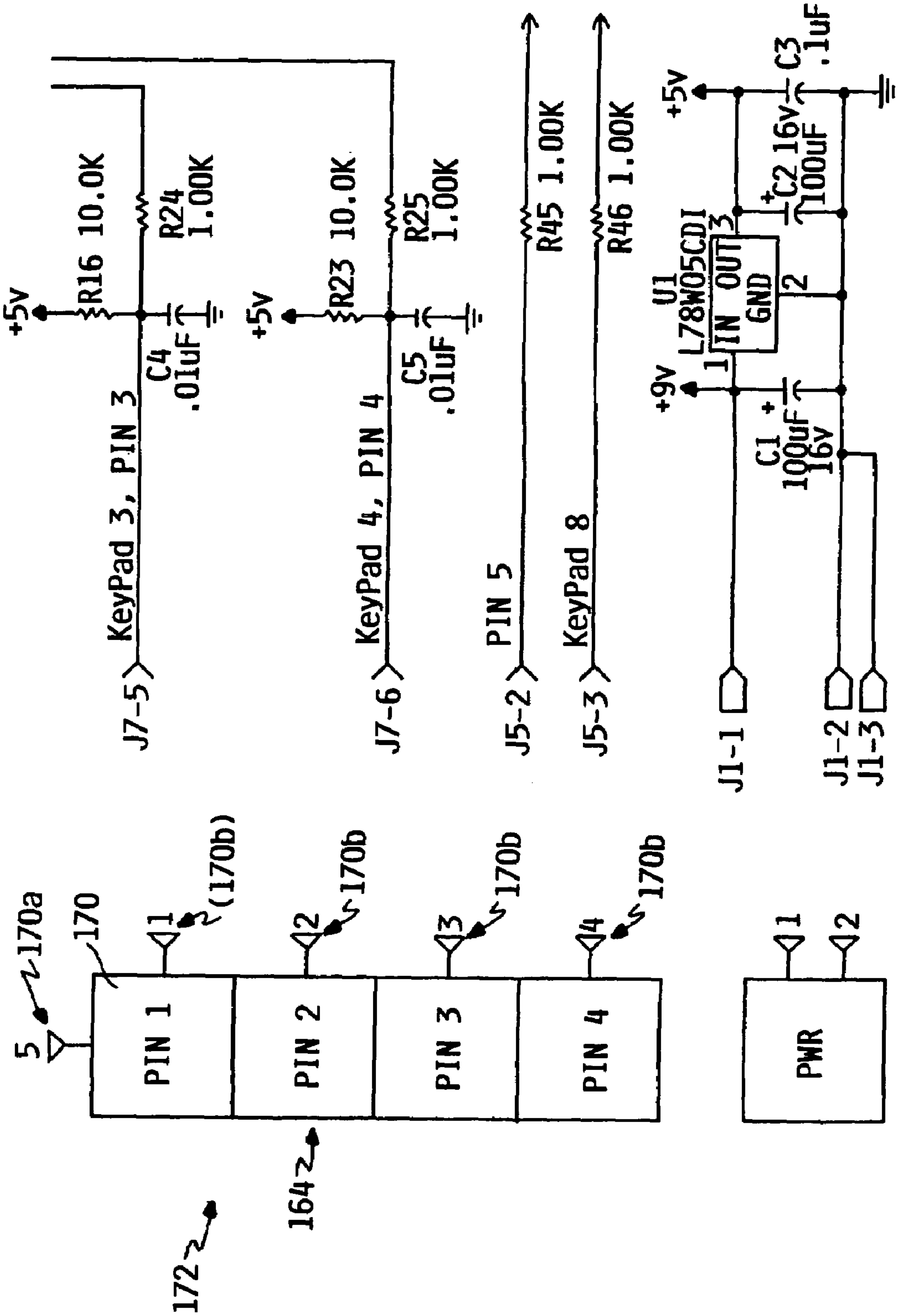
Figures 1, 9E:
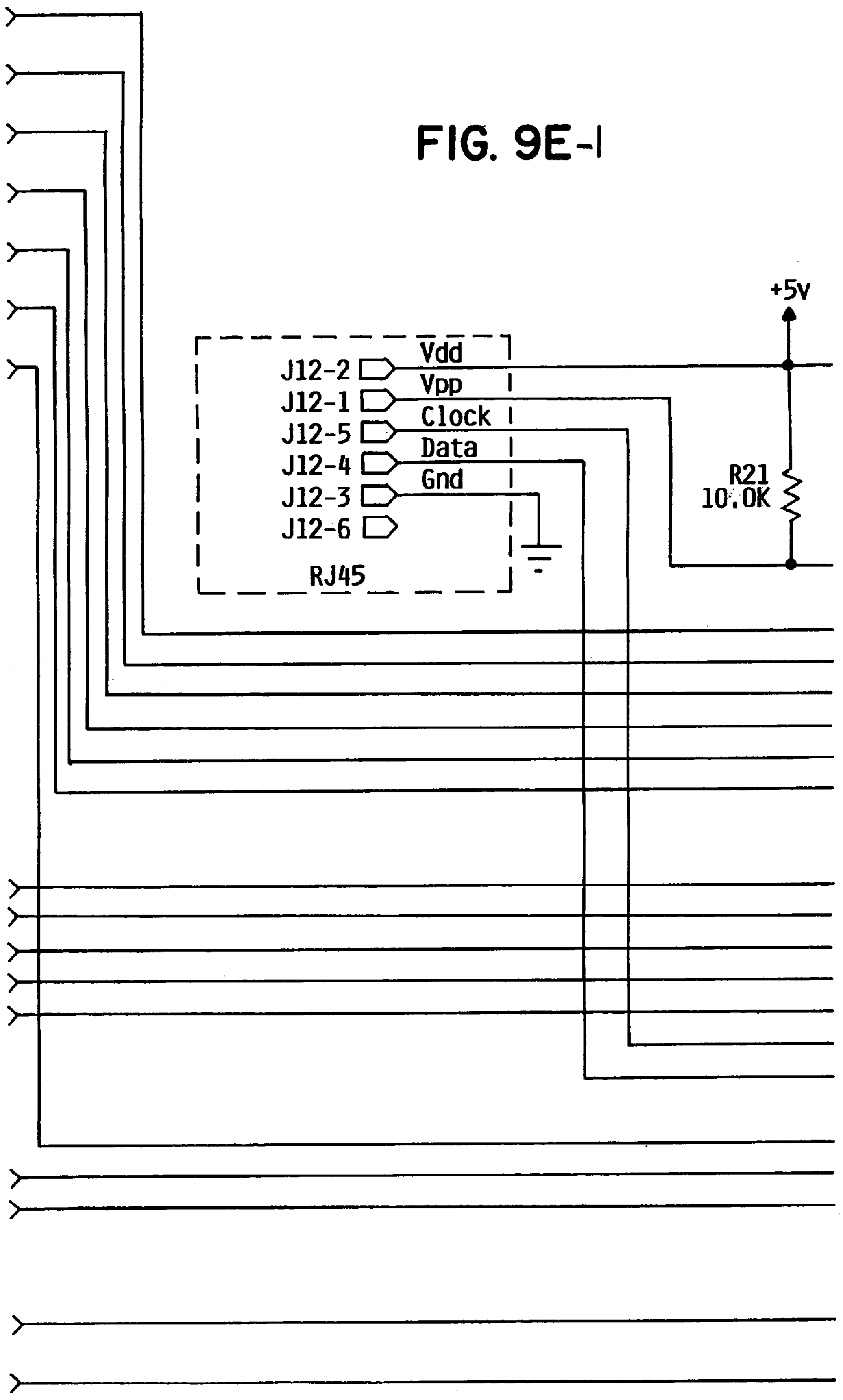
Figures 2, 9E:
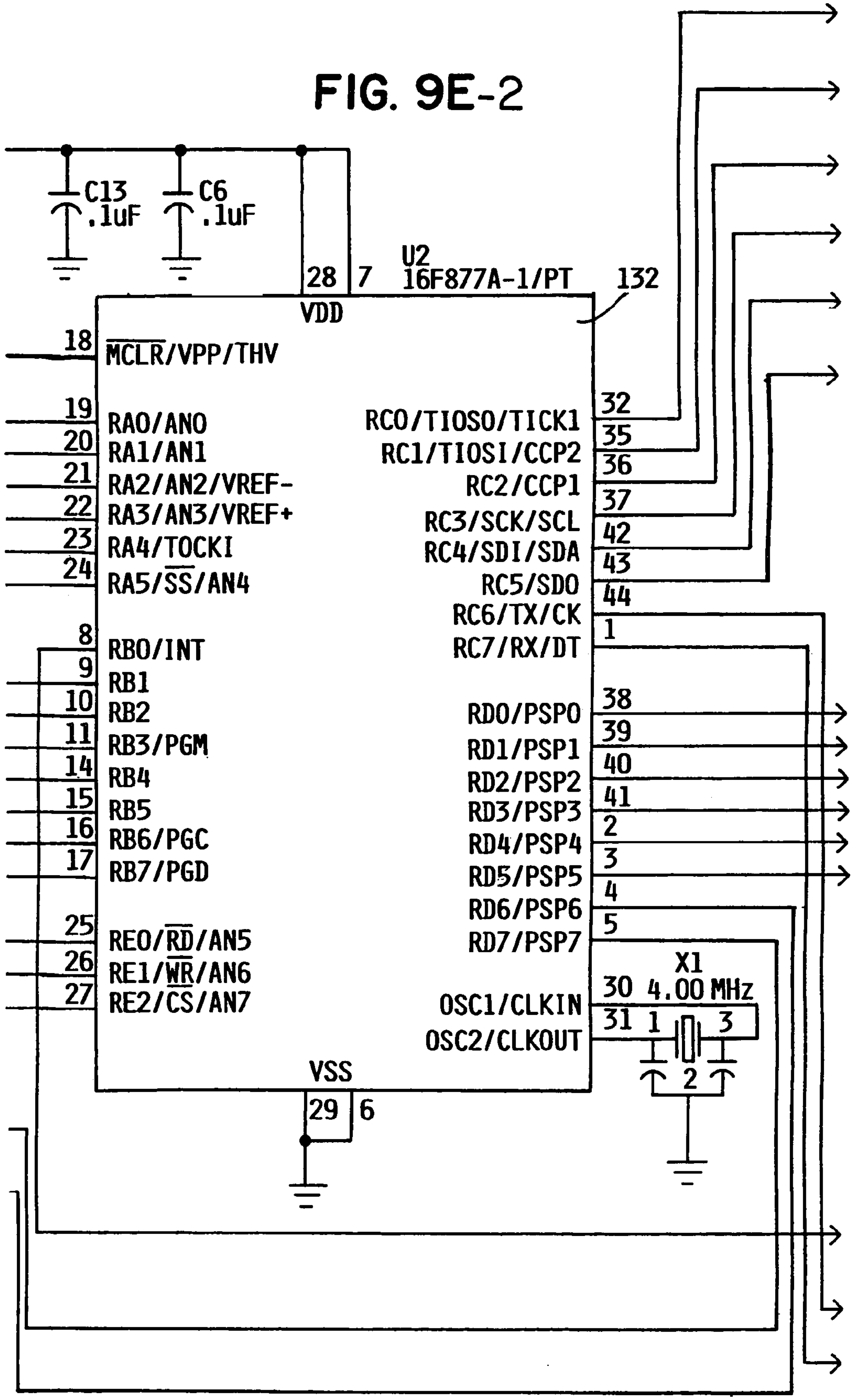
Figures 1, 9F:
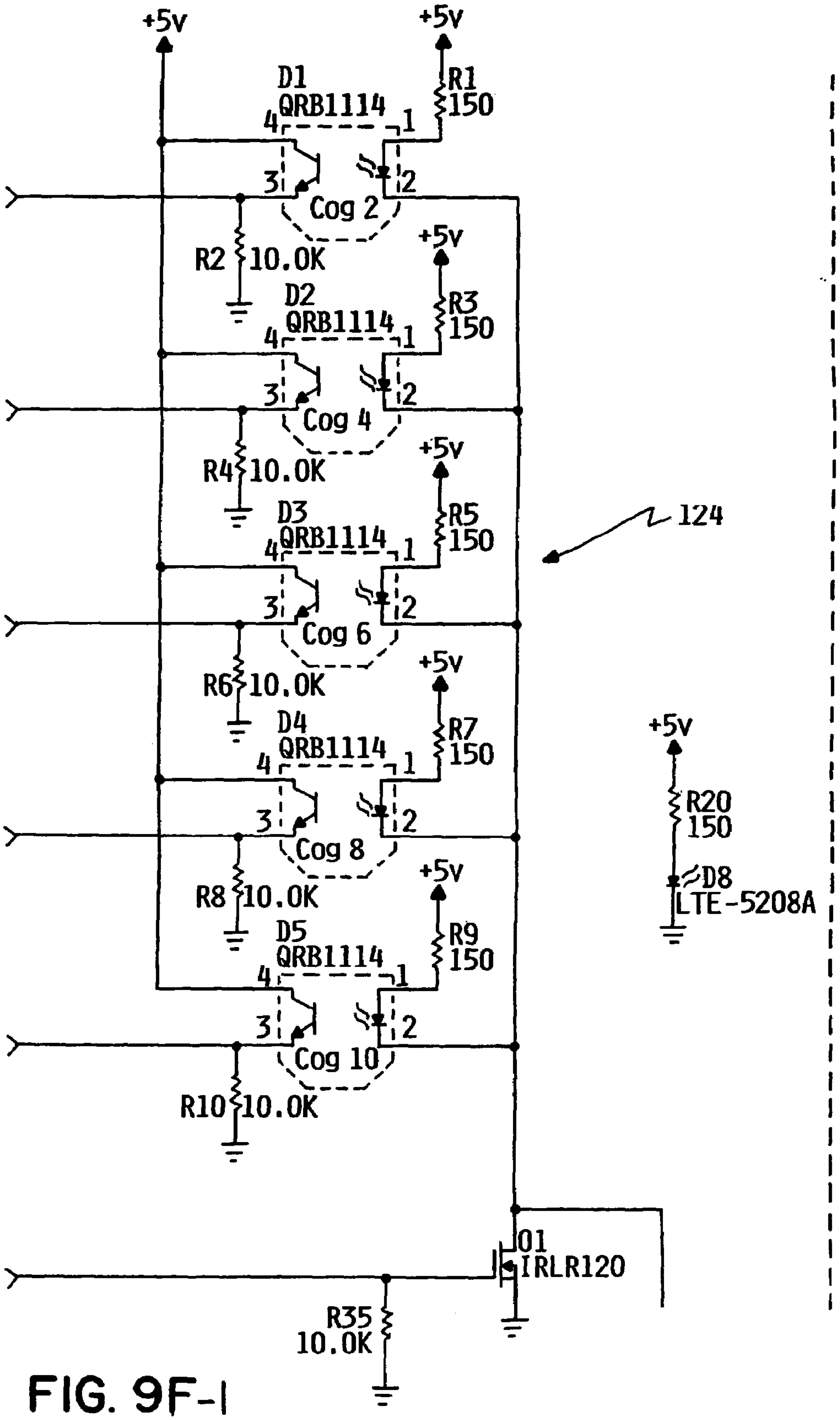
Figures 2, 9F:
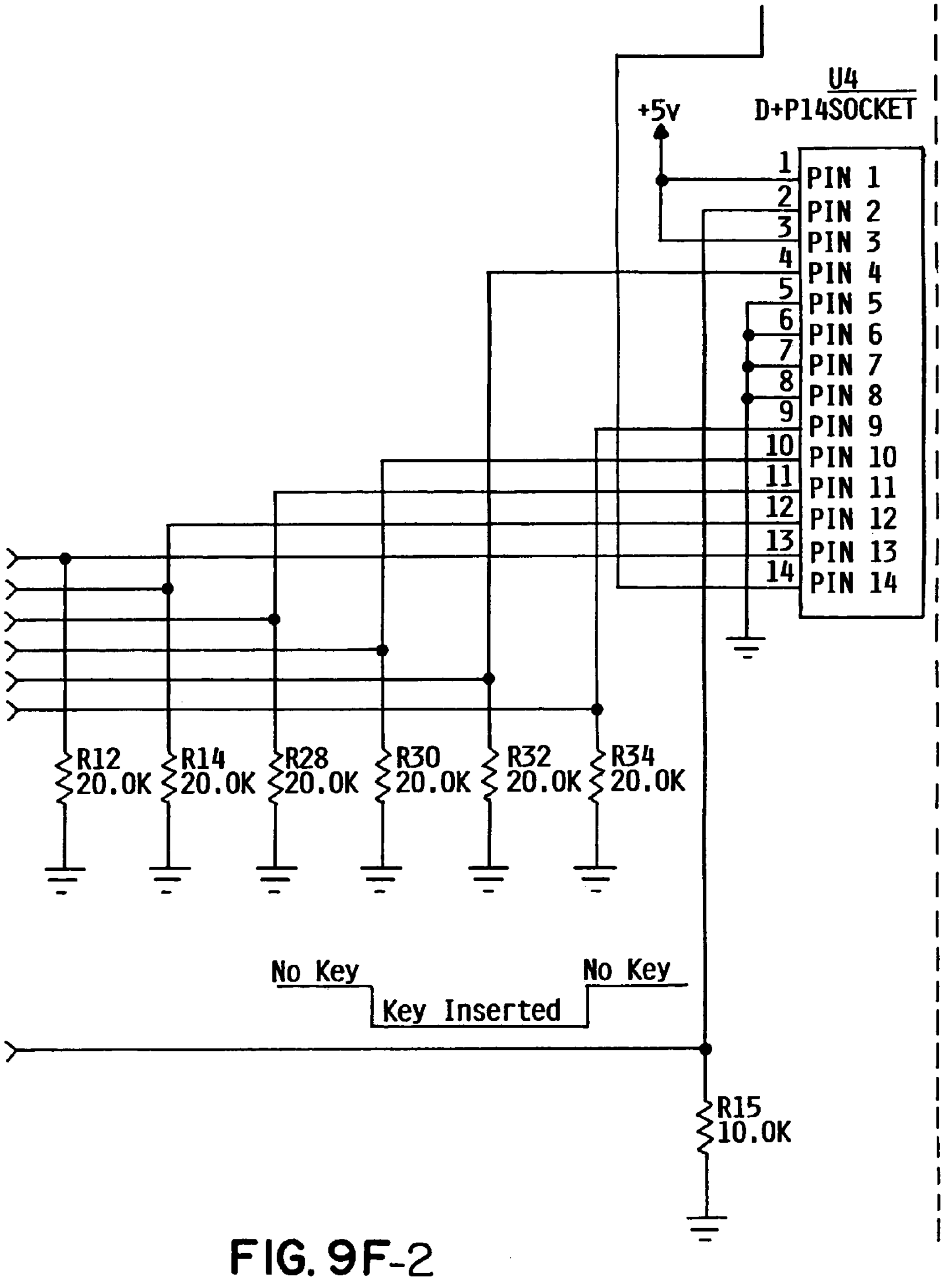
Figures 3, 9F:
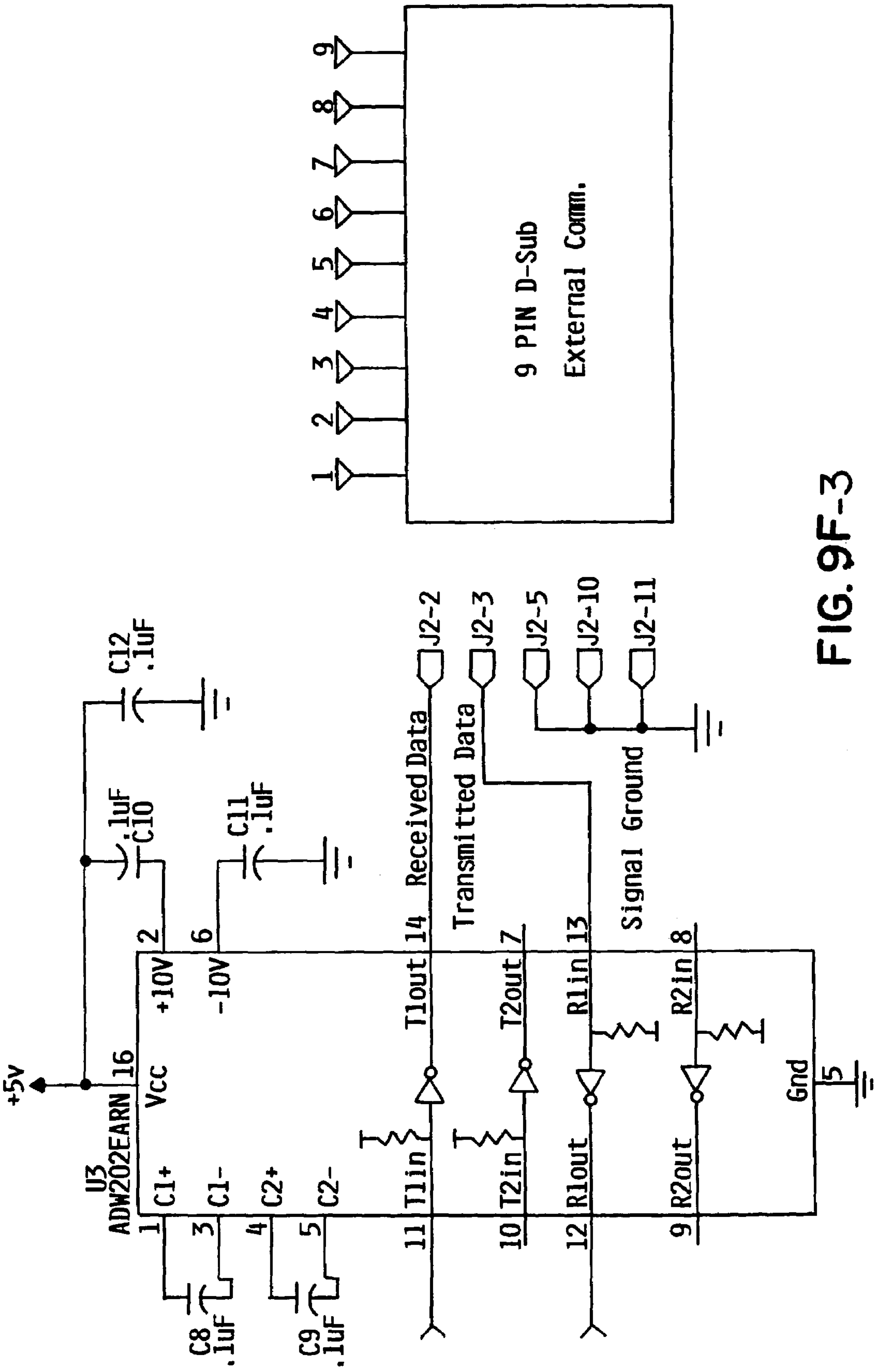
Figures 4, 9F:
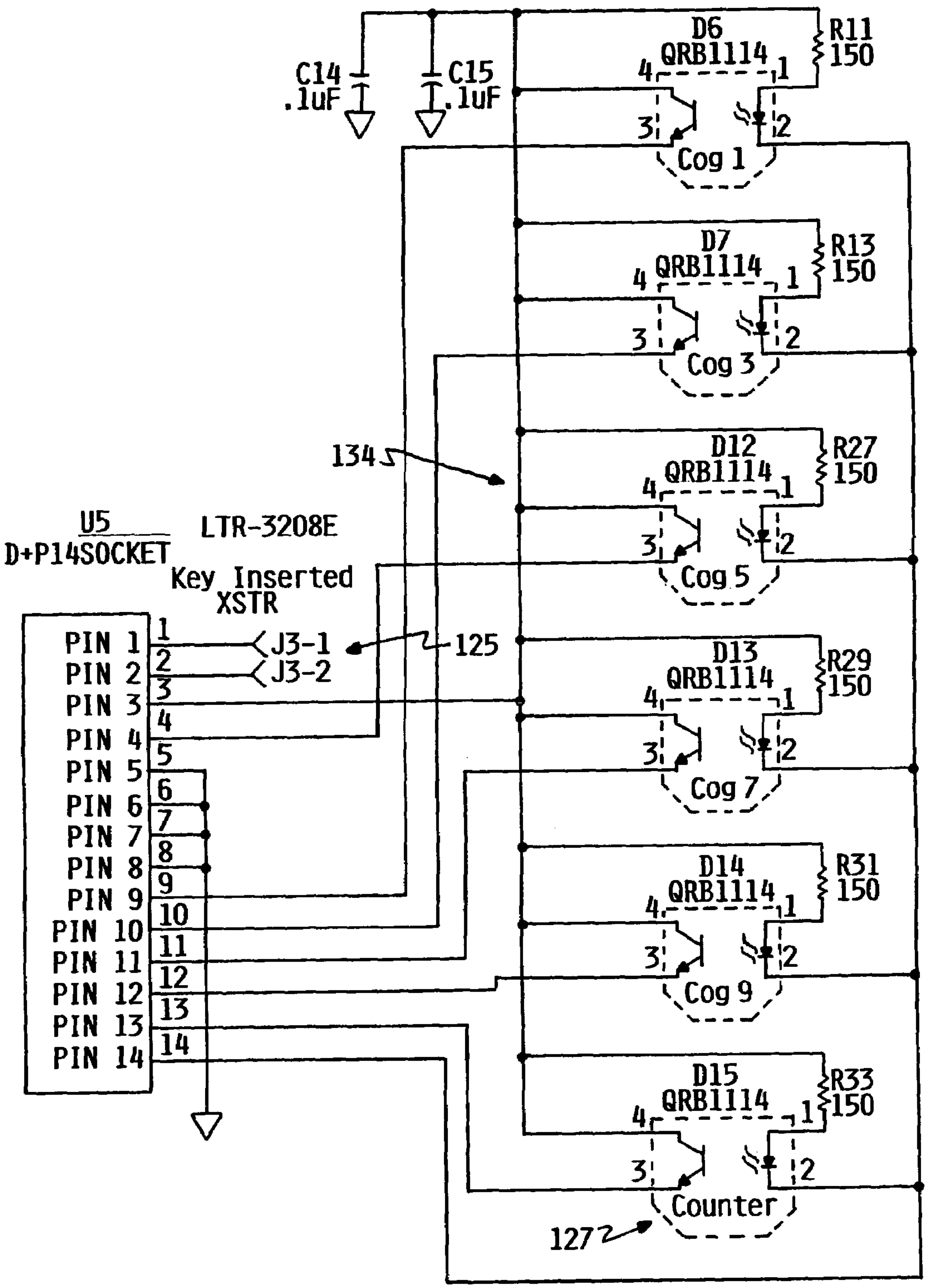

The matrix 172 configuration of FIGS. 9D–9F generally has nine I/O lines to the processor 132. The five column configuration can comprise four columns 170*a* of the device 168 keys 170 (columns 5–8) and the other column can comprise the column 170*a* of the device 164 keys 170 (column 5). Further, the row configuration of this embodiment operably ties the keypad 168 rows 170*b* (rows 1–4) with the pin device 164 rows 170*b* (rows 1–4). Each of the five column 170*a* lines are outputs from the processor 132 adapted to selectively drive high (i.e., 5 volts) or drive low (i.e., 0 volts). Each of the four rows 170*b* are inputs to the processor 132 adapted to selectively read the state of the input, at either the high or low values. As such, reading determines the state of the input for the keys. Low can indicate a pressed state for the key.

The devices 164, 168 are generally only scanned by the processor 132 when input is required, such as when a transaction entry or a pin entry is requested during operation. During scanning or use, each column 170*a* of the matrix 172 is driven low sequentially, while others are high. After a column 170*a* is driven low, the rows 170*b* are read to determine if a key 170 is pressed. For instance, if column six 170*a* of device 168 is driven low and row three 170*b* is read low, the processor 132 determines switch/key "8" has been actuated or pressed. For yet another example, if column seven 170*a* of device 168 is driven low and row one 170*b* reads low, switch/key "3" has been pressed. With regard to the four pin keypad 164 entry, if column five 170*a* of the device 164 is driven low and row three 170*b* reads low, the processor 132 determines that pin "3" has been actuated. After all columns are driven low, it is determined whether more than one key is pressed at a time. If it is so determined, it is possible to discard the input. Other embodiments can permit simultaneous actuation of keys 170.

The processor 132 can process the key entries read from the devices 164, 168 and determine if the input, or input combinations, are valid and store the data. The processing and storage of inputted key data can also take place at the processing device 160. A reading of actuation of the "enter" key on the device 168 by the processor 132 can terminate the key reading and verification portion of the transactional operation or processing system 159 (processor 132, or device 160) program requiring the entry of a purchase or transactional amount. If more than one input is required, or if no keys have been actuated or pressed, the process can be re-started by the processor 132 to sequentially drive the columns low again. Other known devices, key switch configurations, and entry systems and techniques known to one of ordinary skill in the art can be employed with the lock 10 of the present invention to enable use of the lock in transactional and like environments.

For ease of explanation, the availability of both of the unique processing devices of the processing system (processor 132 and processing device 160) will be assumed and the use of either will be implicated in the design of the explained system 159. In such a system 159 it is necessary for the end user to correctly utilize an acceptable key 40. Additionally, it may be required that the end user also input an acceptable pin code within a predetermined acceptable time limit. Comparison database routines are used for both checks.

Figure 13A:
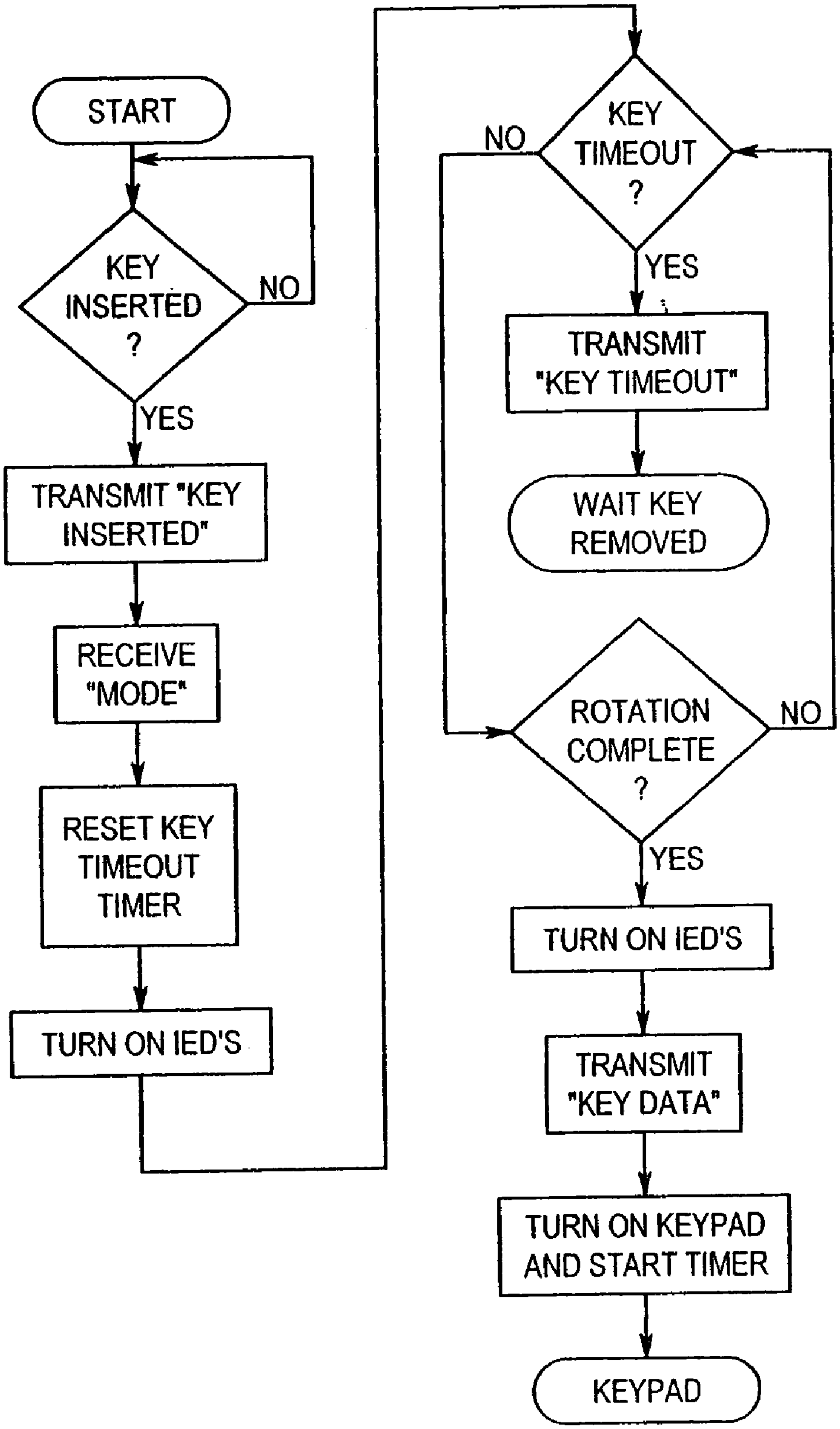
FIGS. 13A–C are a flow chart of one process of operation for a security system in accordance with an embodiment of the present invention.
Figure 13B:
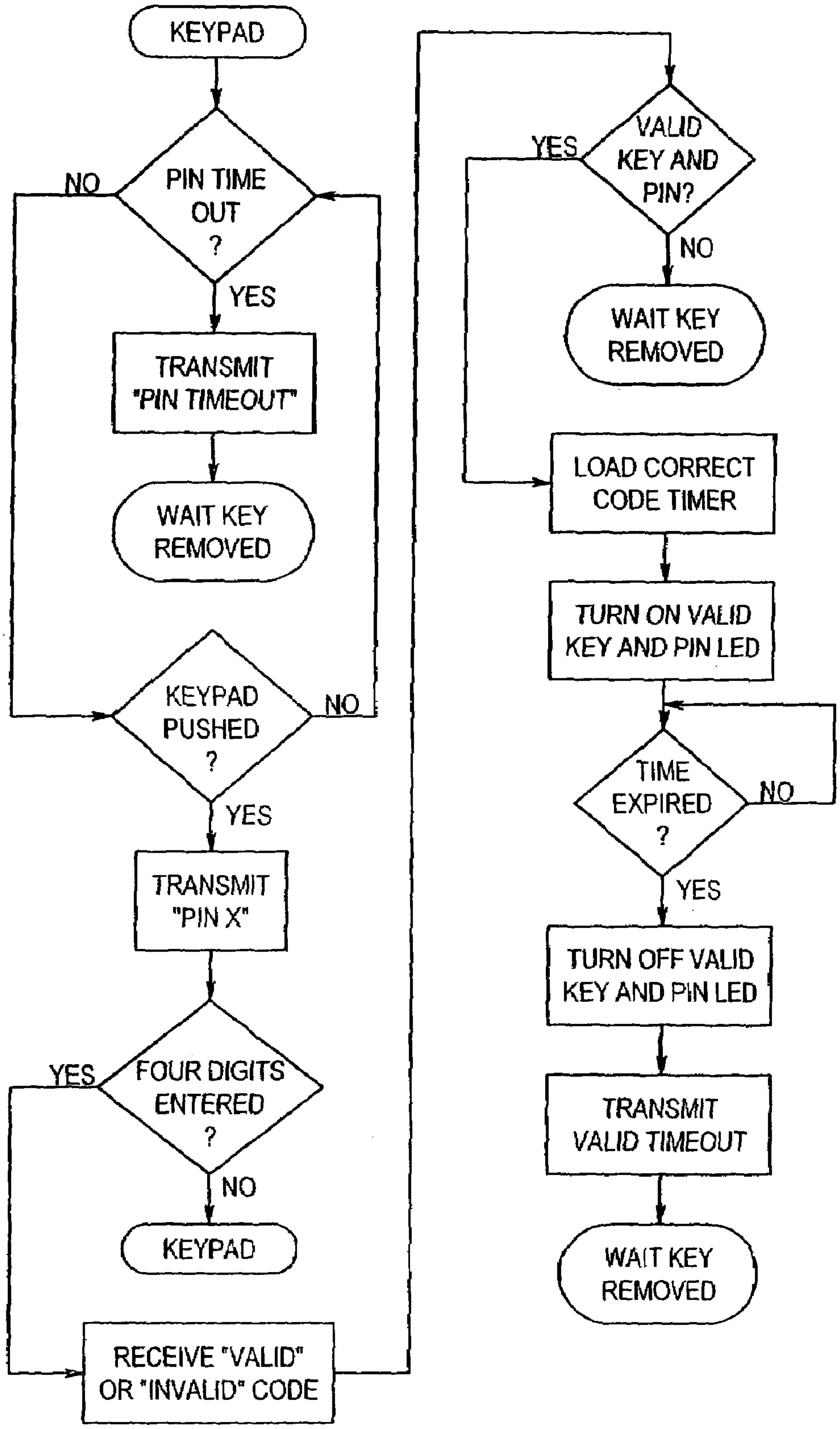
Figure 13C:
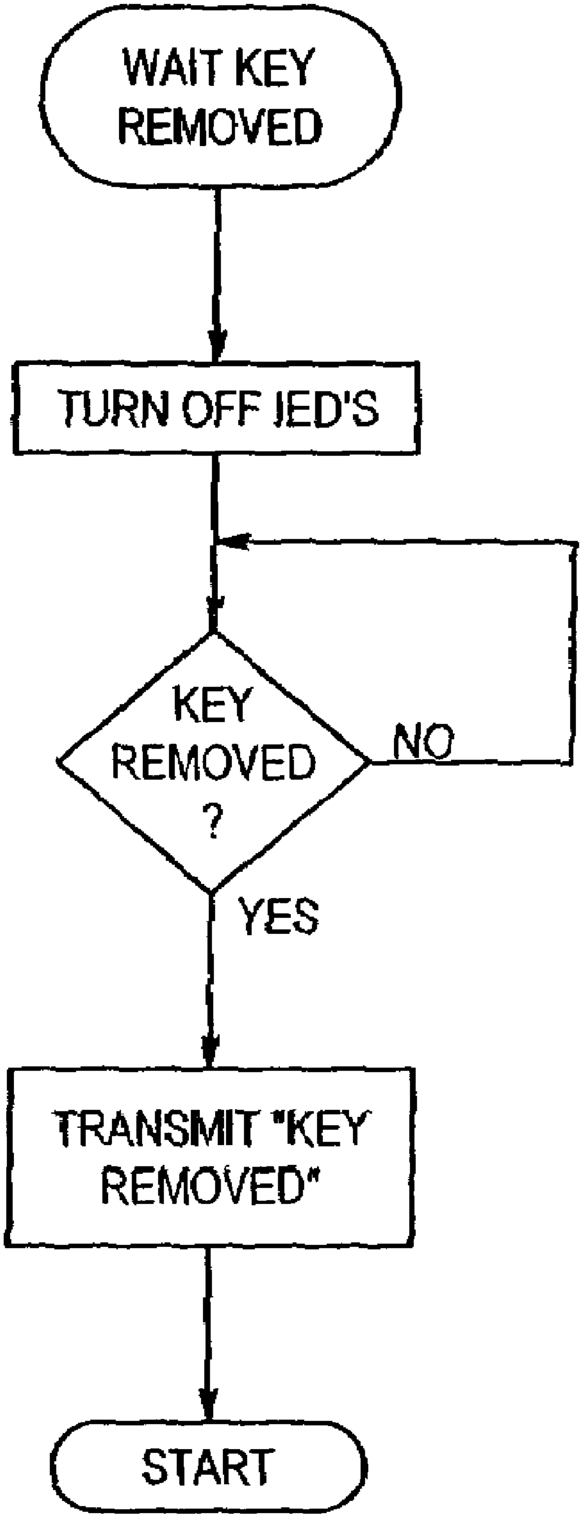

Referring to FIGS. 13A–C, the following is one procedural description of the steps taken to verify key and/or keypad 164 inputs for generating an appropriate lock command signal at the lock 10 based on the processing functions of the system 159. Variations on these procedural steps can be implemented without deviating from the spirit and scope of the present invention. First, the lock 10 verifies that a key 40 has been inserted by reading data from the trigger sensor 125. If a key 40 has been properly inserted/engaged within the lock assembly 12, the IEDs on the sensors 124, 134 are turned on for reading infrared radiation associated with the changes of state of the disc 52 rotations. At this point, the controller 30, and the processor 132 in particular, is placed in receiving mode, for receiving changes of state data. If the key 40 is not fully turned within a predetermined time period, a timeout error is initiated by the lock 10 and further processing of a late key turn is denied. The total rotation sensor 127 reads the changes of state on the disc designated for counting key 40 rotations to determine proper rotation of the key 40. At the point of improper key 40 rotation, the key 40 must be removed and reinserted to restart the rotation detection process.

If a complete proper rotation has been detected by the rotation sensor 127, the accumulated data stored is either transmitted by the processor 132 to the remote device 160 or is self-processed by the processor 132. Regardless, the data, transmitted or self-processed, is either compared to a database of acceptable keys 40, or it is stored for further database comparisons if a keypad 164 entry is required. If a keypad 164 entry is required in an embodiment of the system 159 requiring key 40 and keypad 164 input, another predetermined timeout period is triggered. The keypad 164 entry must be inputted during this time period or else a timeout error occurs.

If the keypad 164 entry is received in time, the PIN numbers entered into the physical pad are stored. Verification routines are processed within the database program. For instance, it may be necessary to identify that the correct number of keystrokes have been inputted, that the entry is coming at an approved time of day, that the input for that particular lock does not have specifically flagged unlock disapproval, and the like. Once the keypad entry is accepted and verified, the keypad entry data and the rotated key data (i.e., changes of state data for each disc 52) are compared with the known database values in either the controller 30 or the remote processing device 160. If the key 40 data alone is being processed in a system 159, then the comparison will only take into account a comparison between the key 40 changes of state data from the sensors 124, 134 and the known acceptable keys in the processing system database. For each embodiment, various verification criteria can be implemented. For instance, the processing system may limit the number of failed attempts to three. Other security verification routines can be utilized by the reprogrammable processing system.

If the comparison at the database is valid, meaning that the key 40 data, or the key 40 data and the keypad 164 data, are correct and acceptable values within the database, then an unlock signal is outputted as the lock command signal. In one embodiment the removal of the key 40 from the security lock 10 will end the unlock signal and require restarting the process. In another embodiment, it will be required that the key 40 be removed after the database comparison is found valid, before an unlock signal is outputted.

It will be understood to those skilled in the art that a database can be created for storing the key 40 changes of state data and/or the keypad 164 entry data at either the microprocessor 132 or in the remote processing device 160. With such a database it will be possible to keep track of the last time a key 40 was used, the number of times a key 40 was used, the erroneous attempts to use a particular lock 10, the erroneous keypad 164 entries attempted with a particular key 40, and the like. This data can be used to better understand the operation of the system and provide further security assistance and protection. Moreover, additional database comparison and processing functions can be programmed in the processing system without deviating from the spirit and scope of the present invention.

Figures 1, 13D:
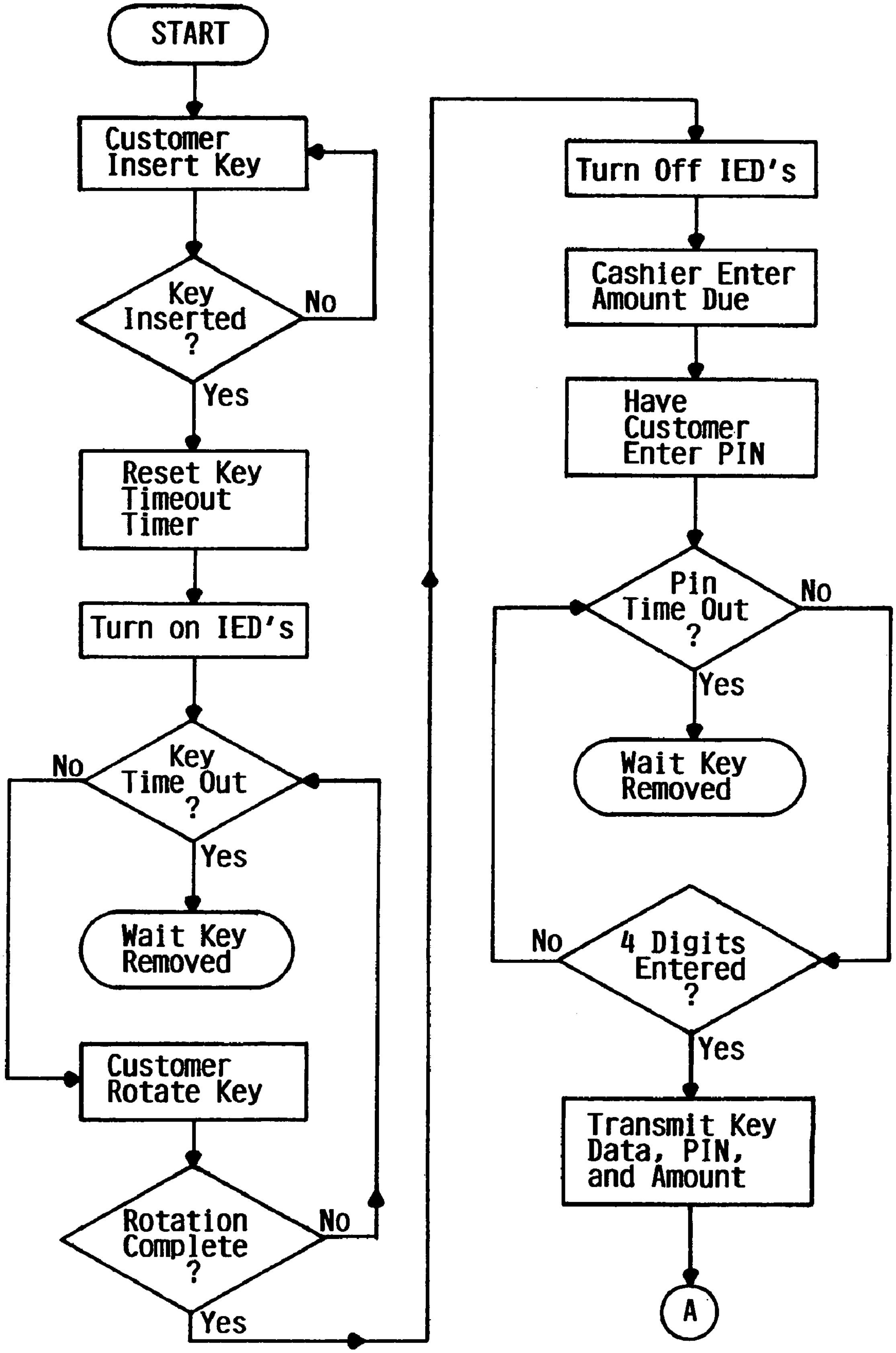
Figures 2, 13D:
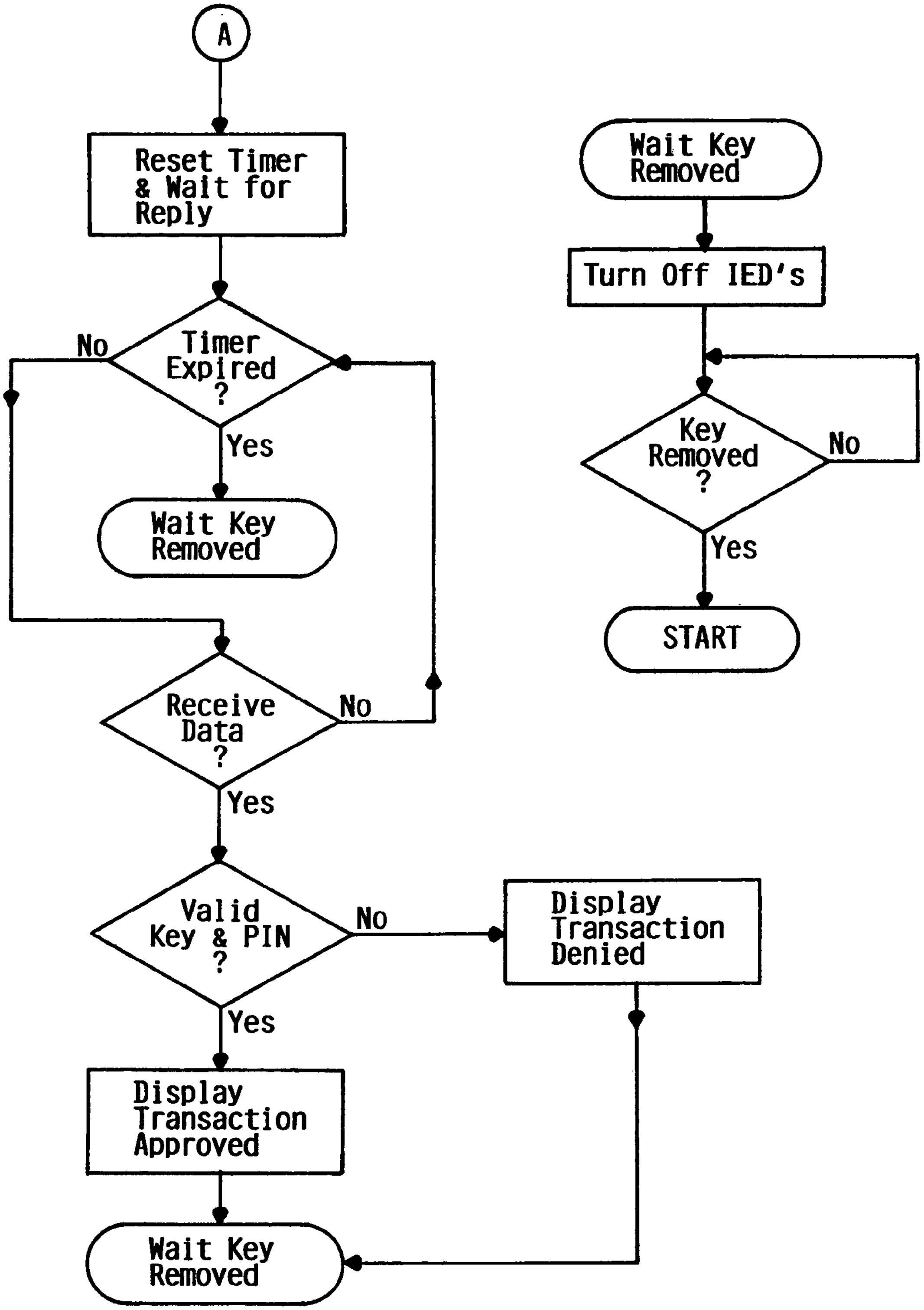

FIG. 13D shows the procedural steps for another embodiment of the present invention directed to transactional security, such as that employed for consumer transactions, credit card purchases, and the like. The controller and depicted circuitry of FIGS. 9D–9F can be utilized to further the procedural and processing steps of FIG. 13D. First, the lock 10 verifies that a key 40 has been inserted by reading data from the trigger sensor 125. If a key 40 has been properly inserted/engaged within the lock assembly 12, the IEDs on the sensors 124, 134 are turned on for reading infrared radiation associated with the changes of state of the disc 52 rotations. At this point, the controller 30, and the processor 132 in particular, are placed in receiving mode, for receiving changes of state data. If the key 40 is not fully turned within a predetermined time period, a timeout error is initiated by the lock 10 and further processing of a late key turn is denied. The total rotation sensor 127 reads the changes of state on the disc designated for counting key 40 rotations to determine proper rotation of the key 40. At the point of improper key 40 rotation, the key 40 can be removed and reinserted to restart the rotation detection process.

If a complete proper rotation has been detected by the rotation sensor 127, the accumulated data stored from reading the changes of state data from the sensors 124, 134 is either transmitted by the processor 132 to the remote device 160 or is self-processed by the processor 132. The sensor's IEDs can then be turned off, and a cashier or other individuals can enter the transactional amount, such as the amount due for that particular consumer purchase. The "entered amount" can be keyed in at the keypad 168, which can be housed on an operably connected device, such as the remote device 160, or on the lock 10 itself. In either event, the entered data can be further processed to accommodate the transaction. As described in detail hereinabove, for the matrix 172 configuration of FIGS. 9D–9F, the processor 132 can process and store the data inputted at the keys 170 of the keypad 168 to read the "entered amount."

Next, an entry can be made by the consumer or end user into the four pin keypad 164 and another predetermined timeout period can be triggered. Again, the reading operation of the keypad 164 pin data can be processed and stored in accordance with the matrix 172 configuration described herein. The keypad 164 entry is to be inputted during this time period or else a timeout error occurs. If the keypad 164 entry is received in time, the PIN numbers entered are stored and the key data, pin entry, and the transactional amount entered are internally processed and/or transmitted to the external system 160. The external system 160 can include computer based cash registers or other known computing devices and systems used in retail, financial, and like transactional environments. Verification routines are processed within the database program. For instance, it may be necessary to identify that the correct number of keystrokes have been inputted, that the entry is coming at an approved time of day, that the input for that particular lock does not have specifically flagged unlock disapproval, that the transactional amount is within a pre-approved range or limit, and the like.

Once the transmitted data is received and the key utilized and the pin entered are verified as valid, a display can be outputted through the LCD display controls 174 to indicate transaction approval. In this particular embodiment, the output signal can be the approval permitting the completion of the transaction, rather than the signal to a door or other device to open. If a keypad entry is invalid and/or the key data is invalid (i.e., the change of state data sensed does not match a known key combination in the database), the LCD controls 174 can display a transaction denial prompt. The transaction processes and steps described herein can be further expanded upon as understood by those of ordinary skill in the art. For instance, the lock 10 and/or remote system 160 can be further linked to devices, computer systems, software, and databases commonly understood in the art to input cost information, process inventory, run credit card software, verify account information, credit limits, and the like.

The database can be programmed in numerous ways. Specifically, in those systems 159 utilizing the processor 132 and the controller 30 to perform the processing tasks, the database can be programmed with the use of a remote computing device, such as a laptop, that can communicate with the controller 30 through the communication port 128. In the system 159 utilizing a remote processing device 160, programming can take place at the remote processing device 160 such that each of the plurality of connected locks 10 is identified in one central database, or in individual databases for each operably connected lock 10.

Figure 14:
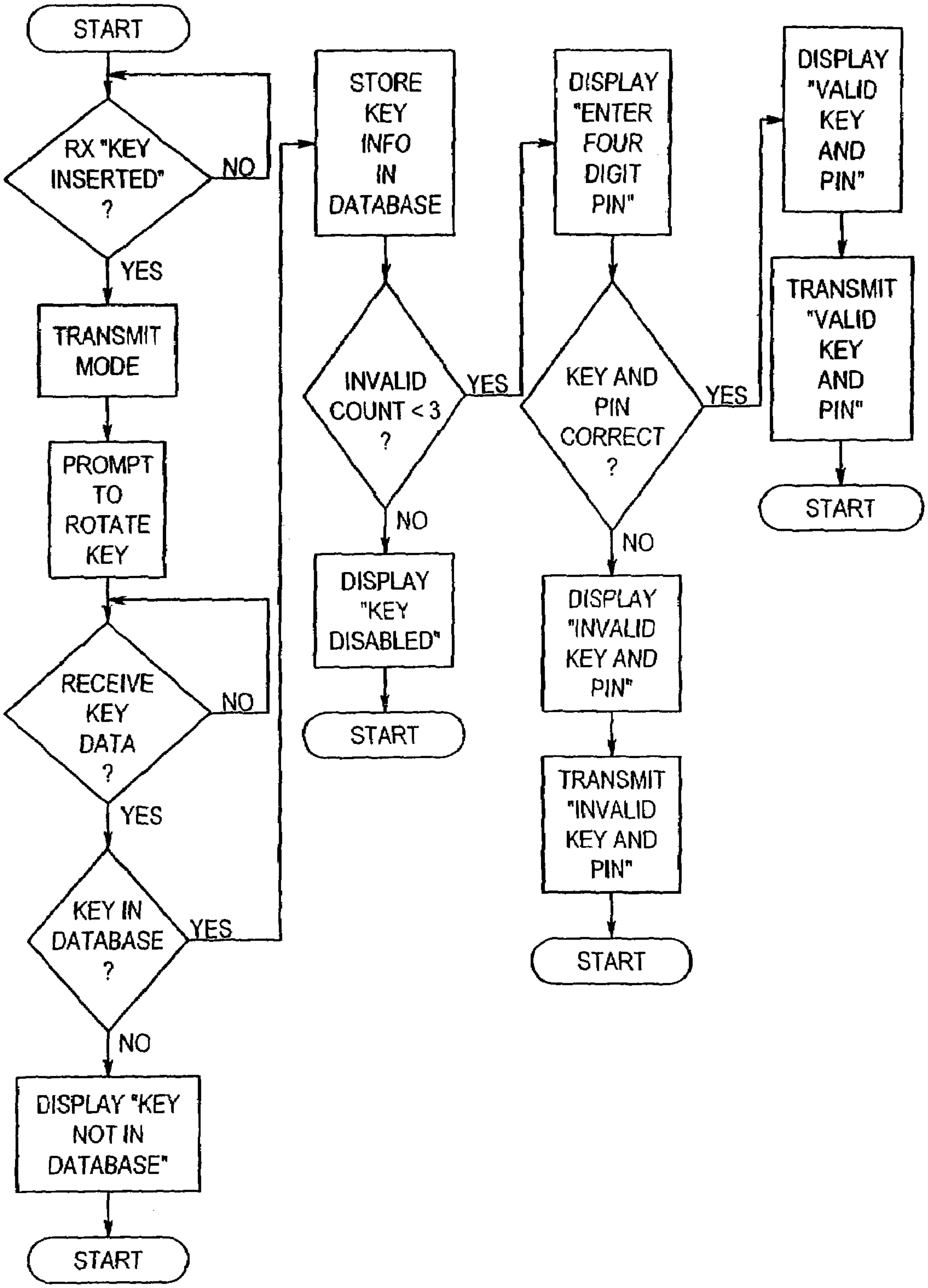
FIG. 14 is a flow chart of one process of programming a database for a security system in accordance with an embodiment of the present invention.
Figure 15A:
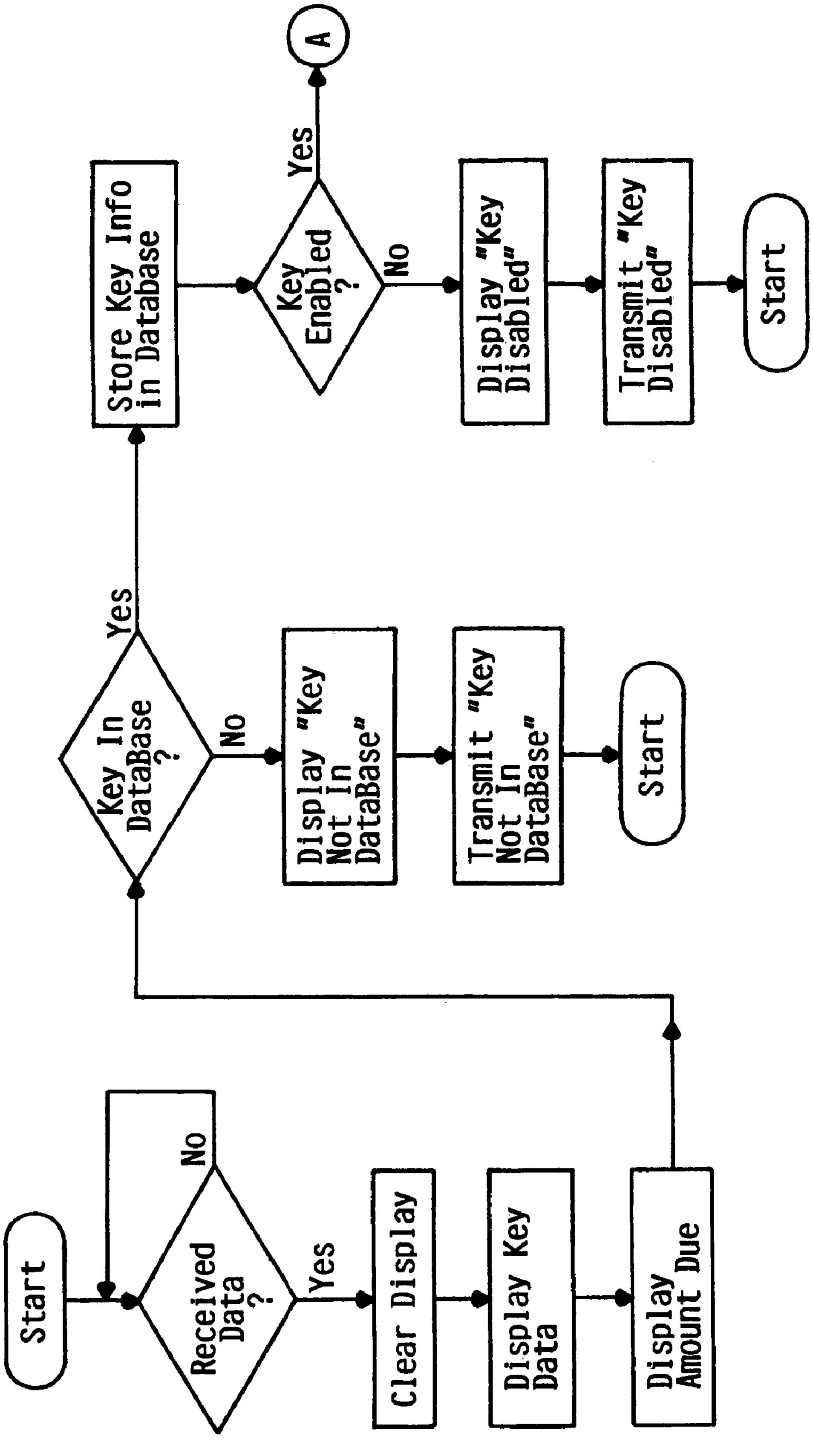
FIGS. 15A and 15B are a flow chart of one process of programming a database for a security system in accordance with an embodiment of the present invention.
Figure 15B:
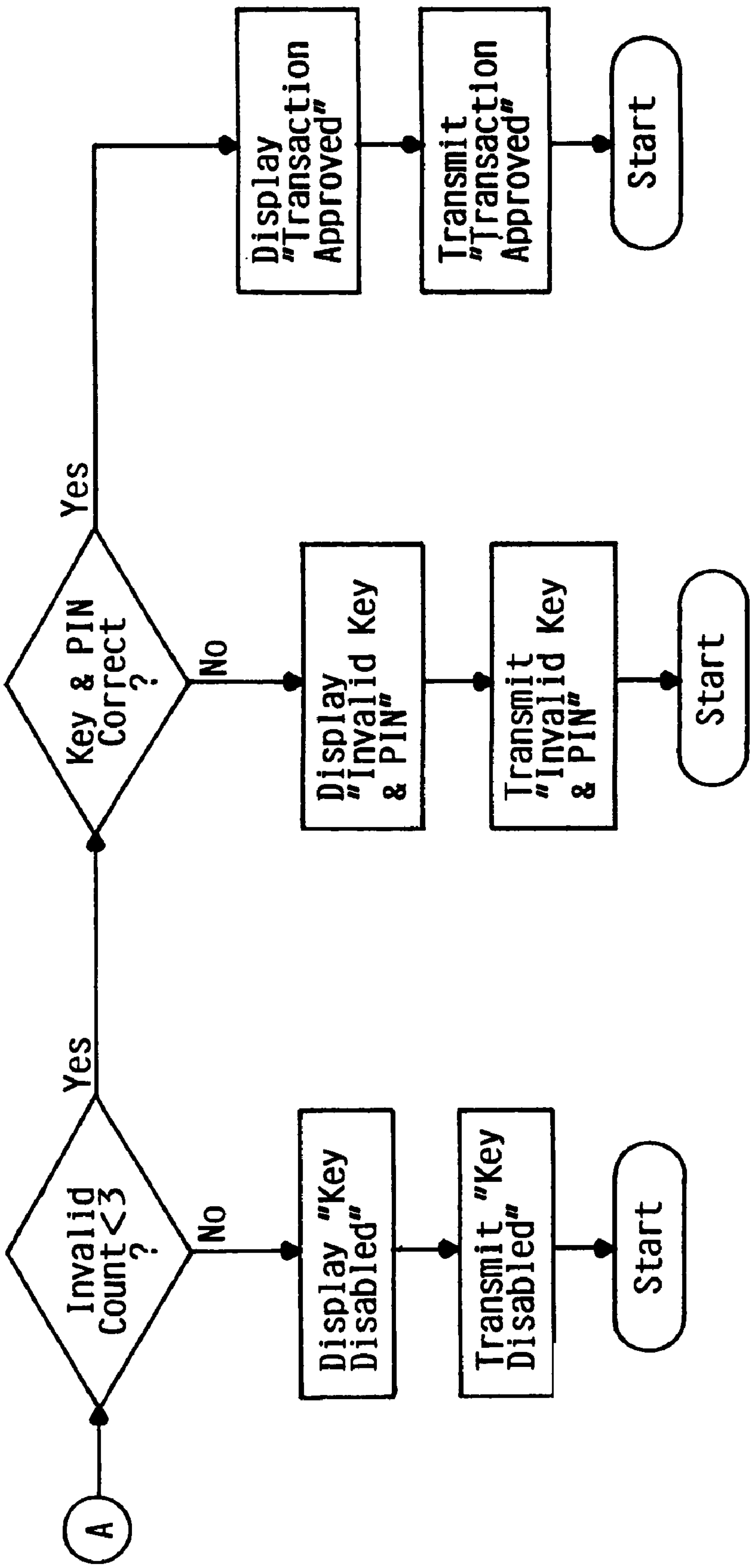

Referring to the acceptable database programming techniques shown in FIGS. 14–15, a key 40 is inserted into the lock 10, the key 40 is rotated, and the changes of state data for that key 40 are sensed and stored in the corresponding database. Keys that have been acknowledged as acceptable database entries can be later removed, qualified or disabled in the database. In a system 159 where a keypad 164 is incorporated, a keypad 164 entry is inputted upon prompting, after the reading of the key 40 data. That keypad 164 PIN is linked in the database to that particular key 40 for future comparison routines. It will be understood by those skilled in the art that input verifications, programming steps and techniques, and other software safeguarding and procedures for programming the database can be added to the steps defined herein without deviating from the scope and spirit of the present invention.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A security lock comprising:

at least one key insertable into the lock;

a plurality of rotatable discs with at least one of the discs being rotatable by the at least one key;

a plurality of sensors capable of optically sensing surface changes of the rotatable discs during rotation of the at least one of the discs to generate a signal used to define a change of state count corresponding with the surface changes;

a controller in operable communication with the plurality of sensors, the controller adapted to process the change of state count from the sensors; and an input device in operable communication with the controller to input transactional data for processing by the controller.

2. The security lock of claim 1, wherein the plurality of sensors include an infrared sensor having a light emitting diode and a phototransistor for optically sensing the surface changes during rotation of the at least one of the discs.

3. The security lock of claim 1, wherein the surface changes of the rotatable discs are defined by a plurality of highs and lows along the surface of the rotatable discs.

4. The security lock of claim 1, wherein the transactional data received by the input device is purchase amount data for use in a commercial transactional environment.

5. The security lock of claim 1, wherein the input device is housed on a portion of the lock.

6. The security lock of claim 1, further including a display device in operable communication with the controller and adapted to display transactional prompting.

7. The security lock of claim 1, wherein the input device is housed separate from the lock.

8. The security lock of claim 7, wherein the input device is housed with a remote processing system in operable communication with the controller.

9. The security lock of claim 1, wherein the controller comprises a processor in operable communication with the sensors.

10. The security lock of claim 9, wherein the processor compares the signal from the sensors with programmed key data to generate a lock command signal.

11. The security lock of claim 10, wherein the lock command signal is a transaction approval signal to enable completion of a corresponding transaction.

12. The security lock of claim 11, wherein the corresponding transaction is selected from a group consisting of: a credit card transaction and a consumer purchase transaction.

13. The security lock of claim 9, further comprising a pin entry keypad in operable communication with the processor.

14. The security lock of claim 13, wherein the pin entry keypad is adapted to receive a user identifying pin code, the user identifying pin code being associated by the processor with the at least one key.

15. The security lock of claim 14, wherein the processor compares the signal from the sensors with the user identifying pin code and programmed key data to generate a lock command signal.

16. The security lock of claim 15, wherein the lock command signal is a transaction approval signal to enable completion of a corresponding transaction.

17. The security lock of claim 16, wherein the corresponding transaction is selected from a group consisting of: a credit card transaction and a consumer purchase transaction.

18. A security system comprising:

a plurality of displaceable discs, wherein at least one of the plurality of displaceable discs includes a plurality of reflective surface changes;

at least one sensor capable of optically sensing the reflective surface changes of the at least one displaceable disc during rotation of the at least one displaceable disc to generate a reflective surface change of state count;

a processor in operable communication with the at least one sensor and adapted to process at least the reflective surface change of state count of the at least one displaceable disc and generate a lock command signal; and an input device in operable communication with the processor to input transactional data.

19. The system of claim 18, wherein the input device is housed on a portion of the lock.

20. The system claim 18, thither including a display device in operable communication with the processor and adapted to display transactional prompting.

21. The system of claim 18, further including an external processing system in operable communication with the processor and adapted to receive the lock command signal and the transactional data for further transactional processing in a consumer purchasing environment.

22. The system of claim 21, wherein the lock command signal is selected from a group consisting of: transaction approved and transaction denied.

23. The system of claim 18, wherein the input device is housed separate from the lock.

24. The system of claim 23, wherein the input device is housed with a remote processing system in operable communication with the controller.

25. The system of claim 18, further comprising a pin entry keypad in operable communication with the processor.

26. The system of claim 25, wherein the pin entry keypad is adapted to receive a user identifying pin code, the user identifying pin code being associated by the processor with the at least one key.

27. The system of claim 26, wherein the processor compares change of state count from the sensors with the user identifying pin code and programmed key data to generate the lock command signal.

28. A method of performing a transaction utilizing an optic security lock, comprising the steps of:

inserting a key into a lock housing such that the key engages a plurality of discs housed within the lock housing and the key is adapted to rotatably displace at least one of the discs;

turning the key to initiate the rotational displacement of the at least one disc;

optically sensing at a plurality of sensors, changes of state of the at least one disc during rotational displacement and communicating a signal from the sensor corresponding with the changes of state to a processing system;

entering transactional data at an input device in operable communication with the processing system; and generating a lock command signal based on processing comparisons at the processing system of the optically sensed changes of state of the at least one disc.

29. The method of claim 28, wherein the lock command signal is a transaction denied signal based on the comparison of the optically sensed changes of state with key data stored in the processing system.

30. The method of claim 28, wherein the lock command signal is a transaction approved signal based on the comparison of the optically sensed changes of state with key data stored in the processing system.

31. The method of claim 28, further including entering a personal identification number into a pin entry keypad device whereby the personal identification number is considered when processing data and generating the lock command signal.

32. The method of claim 28, wherein the signal from the sensor is communicated to the processing system housed within the lock.

33. The method of claim 28, wherein the signal from the sensor is communicated to the processing system housed remote from the lock.

34. The method of claim 28, further including displaying transactional prompting at a display in operable communication with the processing system.

35. A security lock comprising:

at least one key insertable into the lock;

a plurality of rotatable discs with at least one of the discs being rotatable by the at least one key;

means for optically sensing surface changes of the rotatable discs during rotation of the at least one rotatable disc and using the optically sensed surface changes to generate a change of state signal;

control means in operable communication with each of the sensors for processing the change of state signal from the means for optically sensing to generate a lock command signal; and means for inputting transactional data in operable communication with the control means.

36. The security lock of claim 35, wherein the means for optically sensing includes at least one infrared sensor having a light emitting diode and a phototransistor for optically sensing rotation of the discs.

37. The security lock of claim 35, wherein the surface changes of the rotatable discs are defined by a plurality of highs and lows along the surface of the rotatable discs.

38. The security lock of claim 35, wherein the transactional data received by the entry device is purchase amount data for use in a commercial transactional environment.

39. The security lock of claim 35, further including a display device in operable communication with the control means and adapted to display transactional prompting.

40. The security lock of claim 35, wherein the control means comprises a processor in operable communication with the means for optically sensing.

41. The security lock of claim 40, wherein the processor compares the change of state signal from the means for optically sensing with programmed key data to generate the lock command signal.

42. The security lock of claim 41, wherein the lock command signal is a transaction approval signal to enable completion of a corresponding transaction.

43. The security lock of claim 42, wherein the corresponding transaction is selected from a group consisting of: a credit card transaction and a consumer purchase transaction.

* * * * *